United States Patent
Odabasi et al.

(10) Patent No.: US 9,286,427 B1
(45) Date of Patent: Mar. 15, 2016

(54) SYSTEM AND METHOD FOR NETLIST EXTRACTION AND CIRCUIT SIMULATION

(71) Applicant: GEAR DESIGN SOLUTIONS, San Jose, CA (US)

(72) Inventors: Altan Odabasi, Austin, TX (US); Murat Becer, Santa Clara, CA (US); Mustafa Yazgan, Santa Clara, CA (US); Lei Yin, San Jose, CA (US); John Lee, San Jose, CA (US)

(73) Assignee: Gear Design Solutions, Campbell, CA (US)

( * ) Notice: Subject to any disclaimer, the term of this patent is extended or adjusted under 35 U.S.C. 154(b) by 0 days.

(21) Appl. No.: 13/838,926

(22) Filed: Mar. 15, 2013

(51) Int. Cl.
*G06F 17/50* (2006.01)

(52) U.S. Cl.
CPC .................................. *G06F 17/505* (2013.01)

(58) Field of Classification Search
CPC ................................ G06F 17/30; G06F 17/50
USPC ....................................................... 716/103
See application file for complete search history.

(56) References Cited

U.S. PATENT DOCUMENTS

| | | | |
|---|---|---|---|
| 6,480,816 B1 | 11/2002 | Dhar | |
| 7,765,497 B2 | 7/2010 | Cheng | |
| 7,957,949 B1 * | 6/2011 | Subasic et al. | 703/13 |
| 8,073,924 B2 | 12/2011 | Sitaraman | |
| 2003/0079192 A1 * | 4/2003 | Cheong et al. | 716/7 |
| 2011/0029299 A1 * | 2/2011 | Zhu et al. | 703/14 |
| 2012/0151431 A1 * | 6/2012 | Huijbregts et al. | 716/131 |

OTHER PUBLICATIONS

U.S. Appl. No. 13/839,335, filed Mar. 15, 2013, titled "System and Method for Hybrid Cloud Computing for Electronic Design Automation". Inventors: Altan Odabasi, Murat Becer, Mustafa Yazgan, Lei Yin and John Lee.

* cited by examiner

*Primary Examiner* — Mohammed Alam
(74) *Attorney, Agent, or Firm* — Meyertons, Hood, Kivlin, Kowert & Goetzel, P.C.

(57) ABSTRACT

Described herein are systems and methods for a partitioned extraction-simulation technique that efficiently combines a partitioned extraction technique and a partitioned simulation technique by removing and not performing particular steps of the techniques to provide a more efficient netlist extraction and circuit simulation process. In some embodiments, a plurality of circuit simulators directly receive and process a plurality of sub-region netlists that are based on a spatial partitioning of the IC layout. In further embodiments, an EDA hybrid cloud system is implemented using pipelining and serializing of memory data. In these embodiments, an overall EDA process is divided into a plurality of pipelined stages to accelerate the computational speed of the overall EDA process. In further embodiments, EDA data is transferred, over a network, from a memory of one computer system directly to a memory of another computer system by serializing the EDA data.

11 Claims, 12 Drawing Sheets

SYSTEM AND METHOD FOR NETLIST EXTRACTION AND CIRCUIT SIMULATION

FIELD OF THE INVENTION

The present invention relates to electronic design automation, more specifically, to a system and method for netlist extraction and circuit simulation.

BACKGROUND OF THE INVENTION

An integrated circuit ("IC") comprises a plurality of electronic elements on a semiconducting material (such as silicon dioxide) to form a semiconductor device. The electronic elements may include, e.g., resistors, capacitors, diodes, transistors, etc. The electronic elements of an IC may be interconnected to form more complex electronic elements (such as gates, invertors, multipliers, decoders, arithmetic units, controllers, etc.), which are sometimes referred to as circuit elements. An IC also comprises interconnect elements (wires) that interconnect its electronic elements. The interconnect elements may comprise, for example, metal or polysilicon wiring. An IC also comprises of power elements that provide power and ground to each electronic element of an IC. The power elements may comprise, for example, stripes, rails, and vias that produce a power grid structure. Each electronic element may be electrically coupled/connected to the power grid structure. An IC may include electronic, interconnect, and power elements on multiple layers of semiconductor material.

IC design engineers design IC's by converting logical descriptions of elements of the IC's into geometric representations/descriptions of the elements, referred to as IC layouts. An IC layout may include geometric representations of the electronic elements, each electronic element having one or more signal pins, a power pin, and a ground pin. An IC layout may also include geometric representations of the interconnect elements that couple/connect the signal pins of the electronic elements. An IC layout may further include geometric representations of the power elements that couple/connect the power and ground pins of the electronic elements.

Engineers may use electronic design automation ("EDA") applications to design IC layouts. EDA applications provide computer-based applications for the various stages/steps required for producing and processing IC layouts, such as applications for designing, analyzing, and/or simulating IC layouts. EDA applications are used to design and produce layouts by using different geometric objects of varying shapes and sizes to represent the different electronic, interconnect, and power elements of the IC. The electronic, interconnect, and power elements as represented and described in the IC layout are later physically created in an IC based on the descriptions in the IC layout. As an IC may include multiple layers, an IC layout may also include descriptions of multiple layers.

After an IC layout is designed and produced, an EDA application may also provide a circuit simulator application for simulating the designed IC layout. The circuit simulator may be used to verify that the IC layout will produce an IC that will operate as intended/designed by the engineers. To perform the simulation, a netlist is first extracted from the IC layout by a netlist extractor application, a process referred to as netlist extraction. Netlist extraction may provide a translation of the IC layout into the electrical circuit (netlist) it is intended to represent. The extracted netlist may then be used for various EDA purposes, including circuit simulation. The circuit simulator may receive the netlist and produce a simulation result. The simulation result may provide predictions of electrical behavior of the IC that is to be eventually manufactured from the IC layout.

As IC elements become increasingly smaller in size, ICs and IC layouts contain an increasingly larger number of elements. Currently, IC layouts may comprise billions of electronic elements, along with the necessary interconnect and power elements for the electronic elements. As such, the processing time required for EDA applications to perform the circuit simulation of current IC layouts have become increasingly longer. For example, the processing time for circuit simulation may require several days or weeks for some IC layouts. Further, the processor and memory requirements for the EDA applications to process the current ICs have also increased, often requiring the highest performance and most expensive computer systems available. As such, there is a need for a more time and resource efficient method for processing current IC layouts.

SUMMARY OF THE INVENTION

Embodiments herein describe a system for processing an integrated circuit (IC) layout, the system comprising: a computer system configured for partitioning the IC layout to produce a plurality of layout sub-regions, performing netlist extraction on the plurality of layout sub-regions to produce a plurality of sub-region netlists, and performing circuit simulation on the plurality of sub-region netlists to produce a plurality of partitioned simulation results, wherein the plurality of sub-region netlists are not merged to produce a merged netlist and the merged netlist is not partitioned to produce a plurality of partitioned netlists for performing the circuit simulation. The computer system is further configured for merging the plurality of partitioned simulation results to produce a merged simulation result.

The netlist extraction on the plurality of layout sub-regions is performed by a plurality of netlist extractors to produce the plurality of sub-region netlists, the circuit simulation on the plurality of sub-region netlists is performed by a plurality of circuit simulators to produce the plurality of partitioned simulation results, and the plurality of sub-region netlists are sent from the plurality of netlist extractors to the plurality of circuit simulators without further processing of the plurality of sub-region netlists.

The netlist extraction is performed in parallel on the plurality of layout sub-regions; and a first layout sub-region is processed by a first netlist extractor during a first time period that overlaps, at least in part, a second time period that a second layout sub-region is processed by a second netlist extractor.

The circuit simulation is performed in parallel on the plurality of sub-region netlists; and a first sub-region netlist is processed by a first circuit simulator during a first time period that overlaps, at least in part, a second time period that a second sub-region netlist is processed by a second circuit simulator.

The plurality of sub-region netlists used for performing the circuit simulation are based on a spatial partitioning of the IC layout. The plurality of sub-region netlists used for performing the circuit simulation are not based on a partitioning of a merged netlist. Partitioning the IC layout to produce the plurality of layout sub-regions comprises a spatial partitioning of the IC layout based on physical dimensions represented in the IC layout.

Further embodiments include a non-transitory computer readable medium having instructions stored thereon when executed by a processor, process an integrated circuit (IC)

layout, the non-transitory computer readable medium comprising instructions for: configuring a computer system configured for partitioning the IC layout to produce a plurality of layout sub-regions; performing netlist extraction on the plurality of layout sub-regions to produce a plurality of sub-region netlists; and performing circuit simulation on the plurality of sub-region netlists to produce a plurality of partitioned simulation results, wherein the plurality of sub-region netlists are not merged to produce a merged netlist and the merged netlist is not partitioned to produce a plurality of partitioned netlists for performing the circuit simulation.

Further embodiments include a system for processing an integrated circuit (IC) layout, the system comprising: a computer system configured for spatially partitioning the IC layout to produce a plurality of layout sub-regions; performing netlist extraction on the plurality of layout sub-regions to produce a plurality of sub-region netlists; and performing circuit simulation on the plurality of sub-region netlists to produce a plurality of partitioned simulation results, wherein the plurality of sub-region netlists used for circuit simulation are based on a spatial partitioning of the IC layout. A sub-region netlist extracted from a layout sub-region comprises only elements that are spatially within the layout sub-region. The plurality of sub-region netlists are used for circuit simulation without further processing of the plurality of sub-region netlists.

Further embodiments include a non-transitory computer readable medium having instructions stored thereon when executed by a processor, process an integrated circuit (IC) layout, the non-transitory computer readable medium comprising instructions for: configuring a computer system configured for spatially partitioning the IC layout to produce a plurality of layout sub-regions; performing netlist extraction on the plurality of layout sub-regions to produce a plurality of sub-region netlists; and performing circuit simulation on the plurality of sub-region netlists to produce a plurality of partitioned simulation results, wherein the plurality of sub-region netlists used for circuit simulation are based on a spatial partitioning of the IC layout.

Other embodiments described herein comprise a system for performing an overall electronic design automation (EDA) process on an EDA storage object, comprising EDA data, using a plurality of EDA applications, the system comprising: a client system configured for: dividing the overall EDA process into a plurality of pipelined EDA stages, each EDA stage comprising a corresponding EDA application configured for performing the EDA stage; assigning at least one EDA stage to a first server system for performing the assigned EDA stage; loading EDA data of the EDA storage object to a memory; serializing the EDA data in memory to produce serialized EDA data; and transmitting, over a network, the serialized EDA data to a memory of the first server system; and the first server system connected with the client system through the network, the first server system configured for: deserializing the serialized EDA data to produce EDA data in memory; and performing at least one assigned EDA stage by using at least one corresponding EDA application for processing the EDA data in memory, wherein the at least one corresponding EDA application begins processing the EDA data before transmitting of the serialized EDA data to the first server system is completed.

The EDA data is stored as an EDA memory data structure in the memory of the client and first server systems. The client system is assigned to perform at least one EDA stage, the client system is further configured for: before serializing the EDA data in memory, performing the at least one assigned EDA stage by using at least one corresponding EDA application for processing the EDA data in memory.

The client system is further configured for: assigning a particular EDA stage to a second server system for performing the particular EDA stage, the particular EDA stage having a previous stage before the particular EDA stage; and transmitting, over the network, the serialized EDA data to a memory of the second server system, wherein the serializing and transmitting the serialized EDA data begins without waiting for the execution or serialization of EDA data the previous stage to complete, wherein the serialized EDA data is transmitted through multiple connections to the first and second server systems. The second server system connected with the client system through the network, the first server system configured for: deserializing the serialized EDA data to produce EDA data in memory; and performing the particular EDA stage by using at least one corresponding EDA application for processing the EDA data in memory, wherein the at least one corresponding EDA application begins processing the EDA data before transmitting of the serialized EDA data to the second server system is completed.

The client system is further configured for: assigning a same EDA stage to at least two different server systems for performing the assigned EDA stage in parallel. The client system is further configured for: transmitting a message to the first server system, the message specifying each EDA stage assigned to the first server system and a sequence ordering of the assigned EDA stages.

The EDA storage object comprises EDA-based formatting; and loading EDA data of the EDA storage object to the memory comprises: parsing the EDA storage object to extract the EDA data from the EDA-based formatting of the storage object; and storing the EDA data in memory as an EDA memory data structure. Each EDA application produces a plurality of serialized outputs, each serialized output comprising serialized EDA data received by one or more receiving EDA applications executing on one or more systems, wherein the one or more receiving EDA applications begin processing of the serialized EDA data before serializing of all the EDA data is completed.

Further embodiments include a non-transitory computer readable medium having instructions stored thereon when executed by a processor, perform an overall electronic design automation (EDA) process on an EDA storage object, comprising EDA data, using a plurality of EDA applications, the non-transitory computer readable medium comprising instructions for: configuring a client system for: dividing the overall EDA process into a plurality of pipelined EDA stages, each EDA stage comprising a corresponding EDA application configured for performing the EDA stage; assigning at least one EDA stage to a first server system for performing the assigned EDA stage; loading EDA data of the EDA storage object to a memory; serializing the EDA data in memory to produce serialized EDA data; and transmitting, over a network, the serialized EDA data to a memory of the first server system; and configuring the first server system for: deserializing the serialized EDA data to produce EDA data in memory; and performing at least one assigned EDA stage by using at least one corresponding EDA application for processing the EDA data in memory, wherein the at least one corresponding EDA application begins processing the EDA data before transmitting of the serialized EDA data to the first server system is completed.

Further embodiments include a system for processing an integrated circuit (IC) layout, the system comprising: a client system configured for: partitioning the IC layout to produce a plurality of layout sub-regions; performing netlist extraction on the plurality of layout sub-regions to produce a plurality of sub-region netlists; and transmitting the plurality of sub-region netlists to a plurality of server systems through a network; and a plurality of server systems connected with the client system through the network, each server system configured for: receiving at least one sub-region netlist from the client system through the network; and performing circuit simulation on the at least one sub-region netlist to produce at least one partitioned simulation result.

The plurality of server systems produce a plurality of partitioned simulation results that are merged to produce a merged simulation result. The plurality of sub-region netlists are stored in a memory of the client system; and the client system is further configured for: before transmitting the plurality of sub-region netlists to the plurality of server systems, serializing the plurality of sub-region netlists for transmitting the plurality of sub-region netlists through the network. Each server system begins performing circuit simulation on the sub-region netlist before transmitting of the sub-region netlist to the server system is completed.

Further embodiments include a system for processing an integrated circuit (IC) layout, the system comprising: a client system configured for: partitioning the IC layout to produce a plurality of layout sub-regions; and transmitting the plurality of layout sub-regions to a plurality of server systems through a network; and a plurality of server systems connected with the client system through the network, each server system configured for: receiving at least one layout sub-region from the client system through the network; performing netlist extraction on the at least one layout sub-region to produce at least one sub-region netlist; and performing circuit simulation on the at least one sub-region netlist to produce at least one partitioned simulation result. The plurality of server systems produce a plurality of partitioned simulation results that are merged to produce a merged simulation result.

BRIEF DESCRIPTION OF THE DRAWINGS

The novel features are set forth in the appended claims. However, for purpose of explanation, several embodiments are set forth in the following figures.

DETAILED DESCRIPTION

Figure 1:
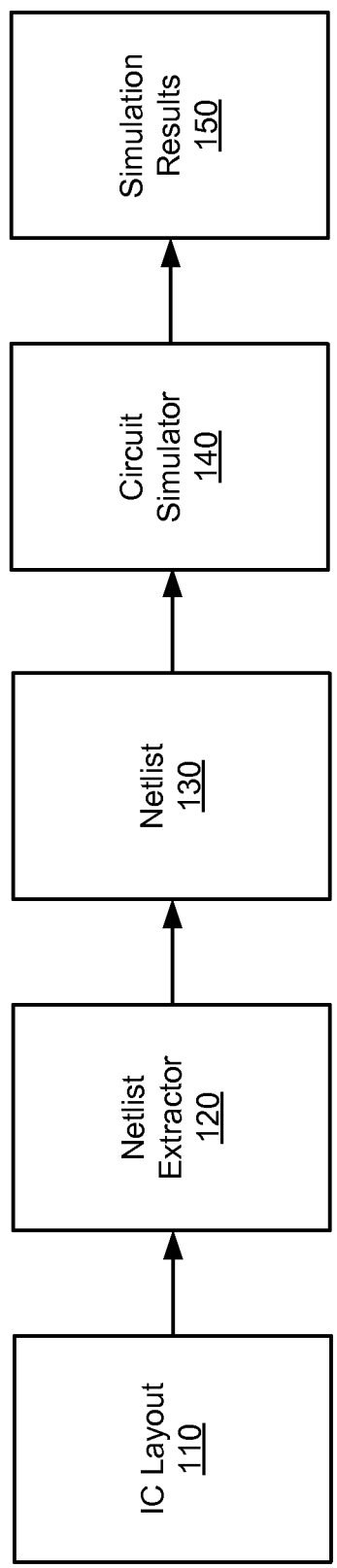
FIG. 1 shows a conceptual diagram of an overview of a conventional netlist extraction and circuit simulation technique.

In the following description, numerous details are set forth for purpose of explanation. However, one of ordinary skill in the art will realize that the embodiments described herein may be practiced without the use of these specific details. In other instances, well-known structures and devices are shown in block diagram form in order to not obscure the description with unnecessary detail.

The description that follows is divided into four sections. Section I describes terms used herein. Section II describes an efficient system and method for netlist extraction and circuit simulation of IC layouts. Section III describes cloud computing for electronic design automation using pipelining and/or serializing. Section IV describes efficient netlist extraction and circuit simulation of IC layouts using cloud computing.

I. Terms

IC element (or element): As used herein, IC elements comprise various devices or components of an IC that are represented on an IC layout. For example, IC elements may comprise electronic, interconnect, and/or power elements. IC elements typically comprise elements that a design engineer intends for an IC on an IC layout, such as electronic, and power elements. However, IC elements may also include parasitic elements on the IC that are not intended by design engineers. Interconnect elements are typically considered parasitic elements as they comprise resistance and capacitance behavior and may reduce the power and performance of the IC as designed and intended by the design engineers. As such, parasitic elements are not explicitly intended by the design engineers but are inherent in the layout of the IC.

IC layout (or layout): As used herein, an IC layout comprises geometric representations/descriptions of elements of an IC. For example, an IC layout may include geometric representations of the electronic elements, each electronic element having one or more signal pins, a power pin, and a ground pin. An IC layout may also include geometric representations of the interconnect elements that couple/connect the signal pins of the electronic elements. An IC layout may further include geometric representations of the power elements that couple/connect the power and ground pins of the electronic elements. An IC layout may be produced using an EDA application that provides computer-based applications for using different geometric objects to represent the different electronic, interconnect, and power elements of the IC. The electronic, interconnect, and power elements as represented and described in the IC layout are later physically created in an IC based on the descriptions in the IC layout. As an IC may include multiple layers, an IC layout may also include descriptions of multiple layers.

Netlist: As used herein, a netlist comprises a description of elements of an IC that are represented on an IC layout. The netlist typically includes a circuit netlist and a parasitic netlist. The circuit netlist may include elements intended by the design engineers for the IC, such as electronic elements. The parasitic netlist may include parasitic elements not intended by the design engineers for the IC, that are present in the interconnect and power elements. A netlist may be produced in different forms and/or formats depending on the use of the netlist.

Netlist extractor: As used herein, a netlist extractor comprises an EDA computer-based application for extracting a netlist from an IC layout (referred to as netlist extraction). Netlist extraction may provide a translation of the IC layout into the electrical circuit (netlist) it is intended to represent. As such, the netlist may comprise a representation of the intended circuit. The extracted netlist may then be used for various EDA purposes, including circuit simulation.

Circuit simulator: As used herein, a circuit simulator comprises an EDA computer-based application for simulating an IC layout for verifying that the IC layout will produce an IC that will operate as intended/designed by the engineers. The circuit simulator may receive a netlist of the IC layout as an input, and produce a simulation result as an output. The simulation result may provide predictions of electrical behavior of the IC that is to be eventually manufactured from the IC layout. As such, the simulation result may be used to verify that the IC layout will produce an IC that will operate and having the electrical behavior intended by the engineers.

EDA application: As used herein, an electronic design automation (EDA) application comprises a computer-based application configured for producing and/or processing IC layouts, such as applications for designing, analyzing, and/or simulating IC layouts. In some embodiments, an EDA module that is a sub-part of an EDA application may itself be considered an EDA application. Examples of EDA applications include an application for designing an IC layout, a layout partitioner, a netlist extractor, a netlist merger, a netlist partitioner, a circuit simulator, and a simulation results merger. In other embodiments, an EDA application may comprise any other application used in the various stages/steps for producing and/or processing IC layouts.

EDA data: As used herein, EDA data comprises data that is used (as input) or produced (as output) by any EDA application for producing and/or processing IC layouts, such as data used or produced in the designing, analyzing, and/or simulating of IC layouts. Examples of EDA data include data describing/representing an IC layout, a layout sub-region, a sub-region netlist, a merged netlist, a partitioned netlist, a partitioned simulation result, and a merged simulation result. In other embodiments, EDA data may comprise any other data used in the various stages/steps for producing and/or processing IC layouts. EDA data may be stored on a storage device (as an EDA storage object) or in memory (as an EDA memory data structure).

EDA storage object: When stored on a storage device (e.g., disk device, etc.), EDA data is stored as an EDA storage object (e.g., EDA file, EDA database, etc.) having formatting (referred to as EDA-based formatting) from an EDA application. For example, an EDA application may format and store EDA data as an EDA file or EDA database, the format being an EDA-based format. An EDA-based format may comprise any file or database format specifically used by EDA applications. Note that EDA-based formatting is typically different than in-memory representations (such as data structures, or serialized data formatting). An EDA storage object is also referred to as an EDA representation of the EDA data.

EDA memory data structure: When stored in memory, EDA data is stored as an EDA memory data structure. The memory data structure may comprise various types of memory data structures, such as arrays, maps, lists, trees, etc. When loading an EDA storage object from a storage device to memory, the EDA application may parse the formatted EDA storage object to extract the unformatted EDA data, which is then stored as a memory data structure in memory. An EDA memory data structure is also referred to as an in-memory representation of the EDA data.

II. Netlist Extraction and Circuit Simulation of IC Layouts

A. Overview of Netlist Extraction and Circuit Simulation Technique

FIG. 1 shows a conceptual diagram of an overview of a conventional netlist extraction and circuit simulation technique. As shown in FIG. 1, the technique includes an IC layout 110, netlist extractor 120, netlist 130, circuit simulator 140, and simulation results 150. As shown in FIG. 1, the technique begins with an IC layout 110. The layout 110 may be produced by a design engineer using an EDA application for designing IC layouts. Examples of such EDA applications include custom layout editors, and automatic placement and routing systems known in the art. The layout 110 may comprise geometric representations/descriptions of elements of an IC, such as electronic, interconnect, and power elements. The layout 110 may comprise descriptions of multiple layers, each layer comprising geometric representations of elements.

The netlist extractor 120 receives the layout 110 as input, and produces the netlist 130. A netlist extractor comprises an EDA computer-based application for extracting a netlist from an IC layout (referred to as netlist extraction). Examples of netlist extraction applications include layout-versus-schematic (LVS) software, and parasitic extraction software known in the art. Netlist extraction may provide a translation of the IC layout into the electrical circuit (netlist) it is intended to represent. As such, netlist extraction may translate the geometric organization of the IC layout 110 into an electrical network (the netlist). Netlist extraction may include non-parasitic extraction and parasitic extraction. Non-parasitic extraction may perform extraction of non-parasitic elements, such as electronic elements. Parasitic extraction may perform extraction of parasitic elements having resistance or capacitance, such as interconnect elements, and power elements. Parasitic extraction is typically performed separate from non-parasitic extraction of the layout, whereby the resistors and capacitors of the layout are extracted separately from the non-parasitic elements.

The netlist 130 may be produced in different forms and/or formats. For example, as known in the art, the netlist 130 may be produced in a list form, and may specify a list of elements and how the elements are interconnected, along with basic information for each element. The netlist 130 may be produced in any particular format, such as the industry standard SPICE format, or a binary database that is used by a coupled netlist-extractor with circuit simulator package, depending on the type of circuit simulator program. Any variety of netlist format may be used for embodiments herein.

As shown in FIG. 1, the circuit simulator 140 receives the netlist 130 and produces simulation results 150. Typically the circuit simulator 140 applies a matrix solution to the netlist 130 to produce the simulation results 150. Different types of simulation algorithms may be used, such as linear simulation, non-linear simulation, transient or static simulation, etc. In other embodiments, other methods for circuit simulation may be used. Examples of circuit simulator applications include SPICE simulators, Fast-SPICE simulators, Voltage-Drop simulators, etc., as known in the art.

The circuit simulator 140 and the simulation results 150 verify that the IC layout 110 will produce an IC that will operate and having the electrical behavior intended by the engineers. For example, the simulation results 150 may show voltage and current waveforms at different locations on the IC over a time axis. For example, analysis of the simulation results 150 may show if the measured voltage drops and measured voltage levels at different locations on the IC are appropriate for the intended IC. For example, the simulation results 150 may show voltage levels at a particular electronic element over time. If the voltage level falls below a certain threshold voltage at any time, this may indicate that the IC may fail or produce low performance.

B. Conventional Partitioned Netlist Extraction

Due to the increasing number of elements on current ICs and IC layouts, techniques have been developed to reduce the processing time needed to perform netlist extraction and circuit simulation of current IC layouts. One such technique for netlist extraction comprises partitioning/dividing the IC layout into a plurality of sub-regions (referred to as layout partitioning), whereby netlist extraction is performed on each sub-region in parallel to produce a plurality of sub-region netlists. The plurality of sub-region netlists are then merged/combined to produce a single merged netlist.

Figure 2:
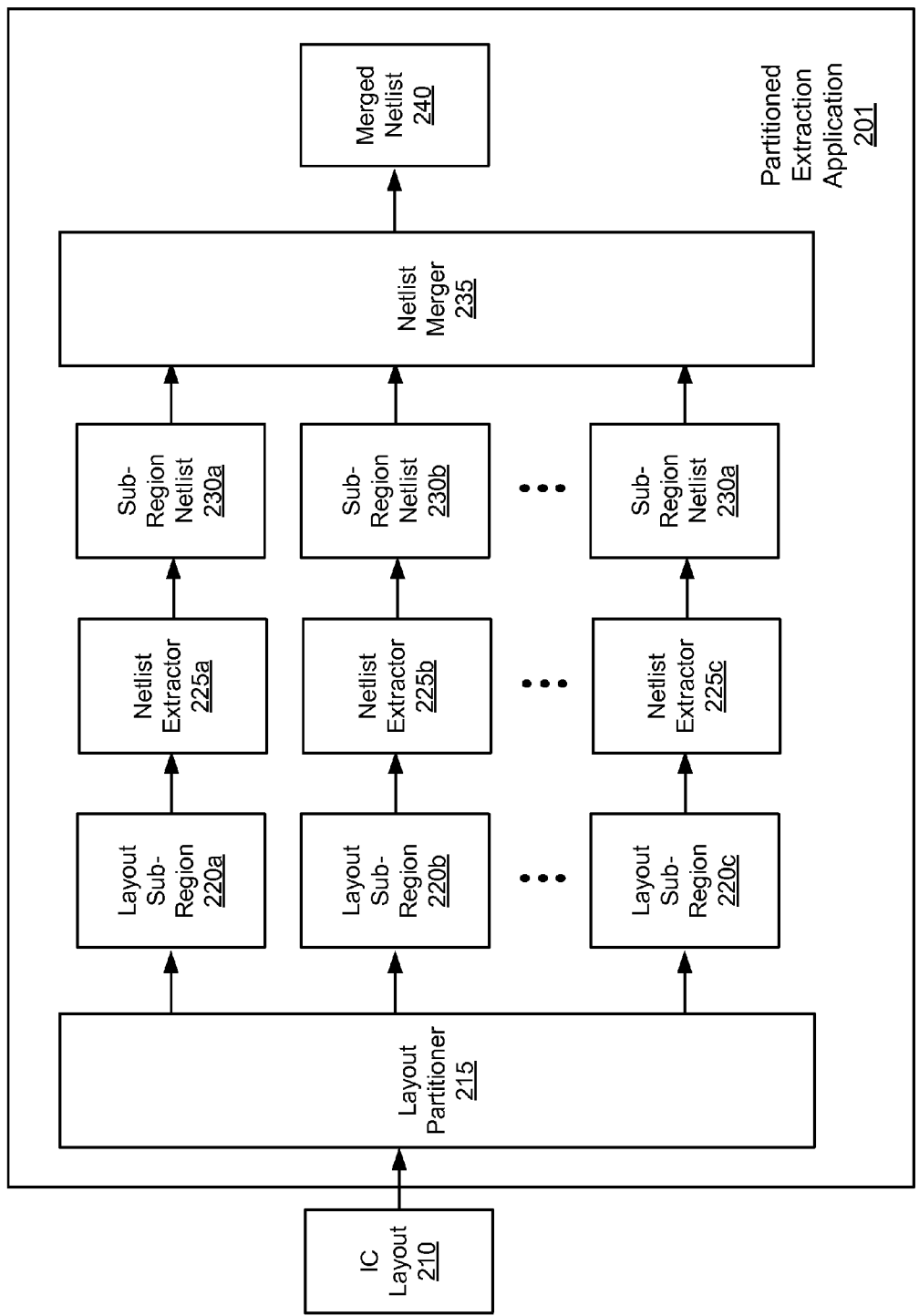
FIG. 2 shows a conceptual diagram of a conventional technique for partitioned netlist extraction.

FIG. 2 shows a conceptual diagram of a conventional technique for partitioned netlist extraction. The overall partitioned netlist extraction technique shown in FIG. 2 may be performed by a partitioned extraction application 201 comprising an EDA computer-based application. Examples of partitioned extraction applications include post-layout extractors used on extract full-chip designs, as known in the art. As shown in FIG. 2, the netlist extraction technique includes an IC layout 210, layout partitioner 215, a plurality of layout sub-regions 220 (such as 220a, 220b, 220c, etc.), a plurality of netlist extractors 225 (such as 225a, 225b, 225c, etc.), a plurality of sub-region netlists 230 (such as 230a, 230b, 230c, etc.), a netlist merger 235, and a single merged netlist 240. Note that the layout partitioner 215, netlist extractors 225, and netlist merger 235 may comprise separate applications, or modules within a single application.

As shown in FIG. 2, the technique begins with an IC layout 210. A layout partitioner module 215 may partition/divide the layout 210 into a plurality of layout sub-regions 220. The partitioning of the layout 210 may comprise spatial partitioning of the layout 210 that is based on the physical dimensions or measurements of the IC that is to be eventually manufactured from the layout 210. As such, this step may sometimes be referred to as physical or spatial partitioning of the layout 210 into a plurality of layout sub-regions 220. The layout partitioner module 215 may comprise a module of the partitioned extraction application 201 configured for performing layout partitioning. Typically when the layout partitioner 215 partitions the IC layout 210 into a plurality of layout sub-regions 220, the layout partitioner 215 produces boundaries between different layout sub-regions 220.

Each layout sub-region 220 is then received and processed by a separate netlist extractor module 225, whereby the plurality of layout sub-regions 220 can be processed in parallel, or in series. A netlist extractor module 225 may comprise a module of the partitioned extraction application 201. Each netlist extractor module 225 processes a layout sub-region 220 to produce a sub-region netlist 230, whereby the plurality of netlist extractors 225 produces a plurality of sub-region netlists 230. Each sub-region netlist 230 that has been extracted from a layout sub-region 220 will only contain elements that are physically/spatially contained in the layout sub-region. The netlist merger module 235 then receives and merges/combines the plurality of sub-region netlists 230 to produce a single merged netlist 240. The netlist merger module 235 comprises a module of the partitioned extraction application 201 for merging sub-region netlists.

Each step in the netlist extraction technique may require significant processing time and use of computer resources as the complexity and number of elements of the IC layout increases. In particular, the processing time and resources required by the netlist merger 235 may be substantial. To merge a plurality of sub-region netlists 230, several processing steps are required. For example, the netlist merger 235 must properly connect/join back together adjacent layout sub-regions 220. For example, if a particular interconnect element was cut/divided into two parts during the layout partitioning process so that the particular interconnect element runs from a left layout sub-region 220 to a right layout sub-region 220, the left layout sub-region 220 and right layout sub-region 220 must be properly joined back together so that the particular interconnect element is no longer cut/divided in two parts. The netlist merger 235 must also ensure that the particular interconnect element is properly connected on the left and right layout sub-regions 220.

The netlist merger 235 must ensure that each IC element in the IC layout is assigned a different identifier that is unique through the entire merged netlist 240. Each IC element in each sub-region netlist 230 will have an assigned identifier that is unique through the sub-region netlist 230. However, IC elements across two or more sub-region netlists 230 may have the same assigned identifier. As such, when producing the merged netlist 240, the netlist merger 235 must verify that each element has a unique identifier through the entire merged netlist 240 and reassign identifiers if necessary. The netlist merger 235 may also perform other functions, such as ordering of elements in a net-by-net basis, formatting for specific file formats, and compression or reduction of the netlist elements to reduce output file size.

C. Conventional Partitioned Circuit Simulation

Techniques have also been developed to reduce the processing time needed to perform circuit simulation of current IC layouts. One such technique for circuit simulation comprises receiving a merged netlist, partitioning/dividing the merged netlist into a plurality of partitioned netlists (referred to as netlist partitioning), and performing circuit simulation on each partitioned netlist in parallel to produce a plurality of partitioned simulation results. The plurality of partitioned simulation results are then merged/combined to produce a single merged simulation result.

Figure 3:
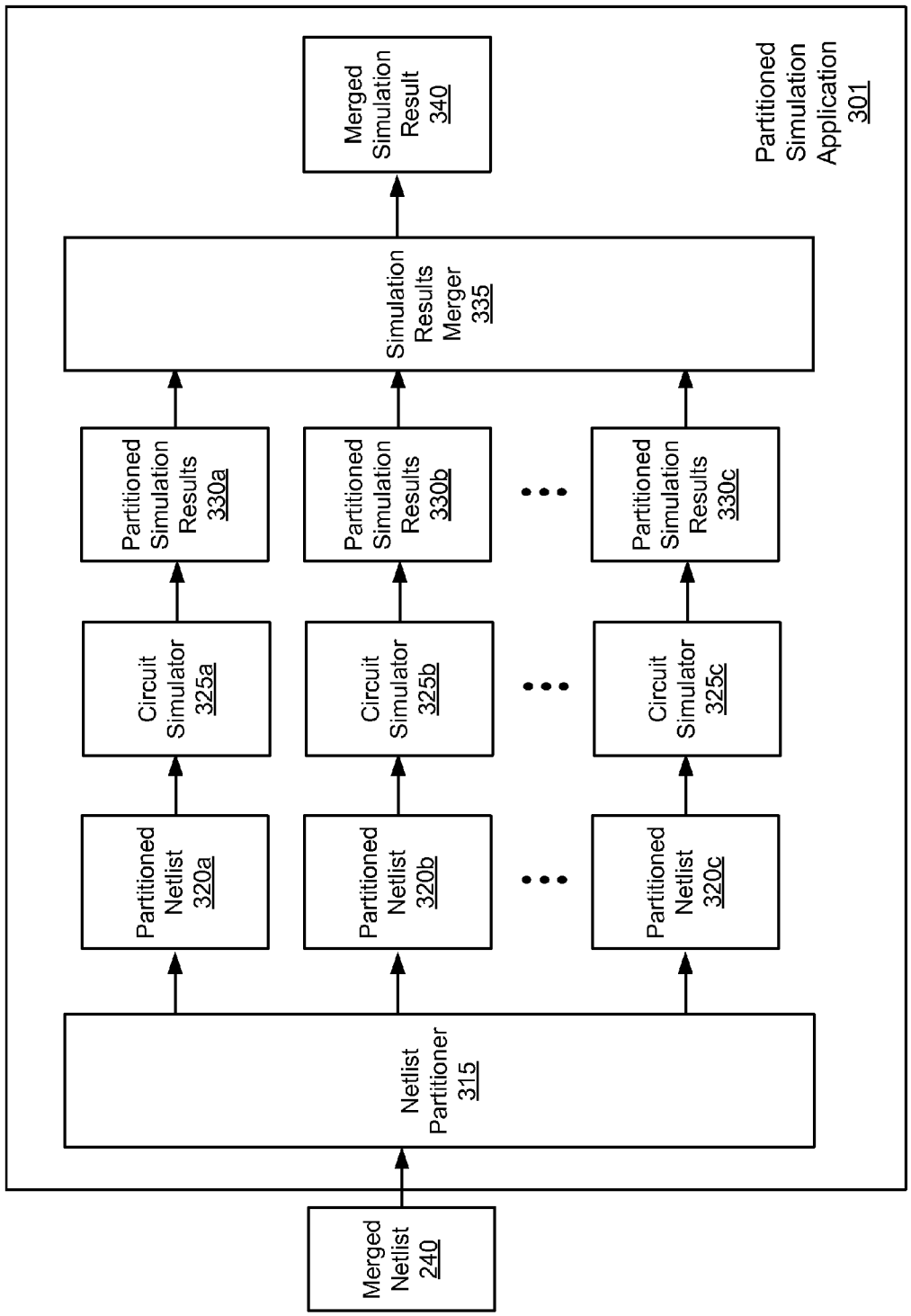
FIG. 3 shows a conceptual diagram of a conventional technique for partitioned circuit simulation.

FIG. 3 shows a conceptual diagram of a conventional technique for partitioned circuit simulation. The overall partitioned circuit simulation technique shown in FIG. 3 may be performed by a partitioned simulation application 301 comprising an EDA computer-based application. Examples of partitioned simulation applications include parallel SPICE simulators, parallel fast-SPICE simulators, and parallel IR drop simulators, as known in the art. As shown in FIG. 3, the circuit simulation technique includes a single merged netlist 240, a netlist partitioner 315, a plurality of partitioned netlists 320 (such as 320a, 320b, 320c, etc.), a plurality of circuit simulators 325 (such as 325a, 325b, 325c, etc.), a plurality of partitioned simulation results 330 (such as 330a, 330b, 330c, etc.), a simulation results merger 335, and a single merged simulation result 340.

As shown in FIG. 3, the technique begins with a single merged netlist 240. A netlist partitioner module 315 may partition/divide the merged netlist 240 into a plurality of partitioned netlists 320. The netlist partitioner module 315 comprises a module of the partitioned simulation application 301 configured for partitioning a merged netlist. Each partitioned netlist 320 is then received and processed by a separate circuit simulator module 325, whereby the plurality of partitioned netlists 320 are processed in parallel. Each circuit simulator module 325 processes a partitioned netlist 320 to produce a partitioned simulation result 330, whereby the plurality of circuit simulators 325 produces a plurality of partitioned simulation results 330. A circuit simulator module 325 comprises a module of the partitioned simulation application 301. The simulation results merger module 335 then receives and merges/combines the plurality of partitioned simulation results 330 to produce a single merged simulation result 340. The simulation results merger 335 comprises a module of the partitioned simulation application 301 configured for merging partitioned simulation results. In some cases, feedback between modules 315, 325, and 335 may exist in order to improve accuracy or performance. For example, such feedback may induce iterations, whereby circuit simulator modules 325 are called repeatedly until certain accuracy conditions are met.

Each step in the circuit technique may require significant processing time and use of computer resources as the complexity and number of elements of the IC layout increases. In particular, the processing time and resources required by the netlist partitioner 315 may be substantial. To partition the merged netlist 240 into a plurality of partitioned netlists 320, several processing steps are required. For example, the netlist partitioner 315 typically applies graph-based heuristic algorithms (such as min-cut algorithm) to heuristically determine how to partition/divide the merged netlist 240 into a plurality of partitioned netlists 320. The goal of such graph-based algorithms is to find ways to partition the merged netlist 240 such that the number of elements crossing between the partitioned netlists 320 is minimized, whereby a smaller number of crossing elements indicates that the coupling/communication between each partitioned netlist 320 partition is less which is advantageous in a parallel algorithm. In contrast, a larger number of crossing elements indicates that the coupling/communication between each partitioned netlist 320 partition is greater which is not advantageous in a parallel algorithm.

Conventionally, the techniques for partitioned netlist extraction and partitioned circuit simulation are separate techniques that comprise different stages in the development of an IC layout. Conventionally, the techniques for partitioned netlist extraction and partitioned circuit simulation are performed by separate EDA applications, such as a partitioned extraction application 201 and a partitioned simulation application 301. Conventionally, a merged netlist 240 is produced by the partitioned extraction application 201 (performing the technique for partitioned netlist extraction), which passes the merged netlist 240 to the partitioned simulation application 301 (performing the technique for partitioned circuit simulation). Conventionally, the final output for the partitioned extraction application 201 and the technique for partitioned netlist extraction is a single merged netlist 240. Conventionally, the only input for the partitioned simulation application 301 and the technique for partitioned circuit simulation is the single merged netlist 240.

D. EDA Computer System

Figure 4:
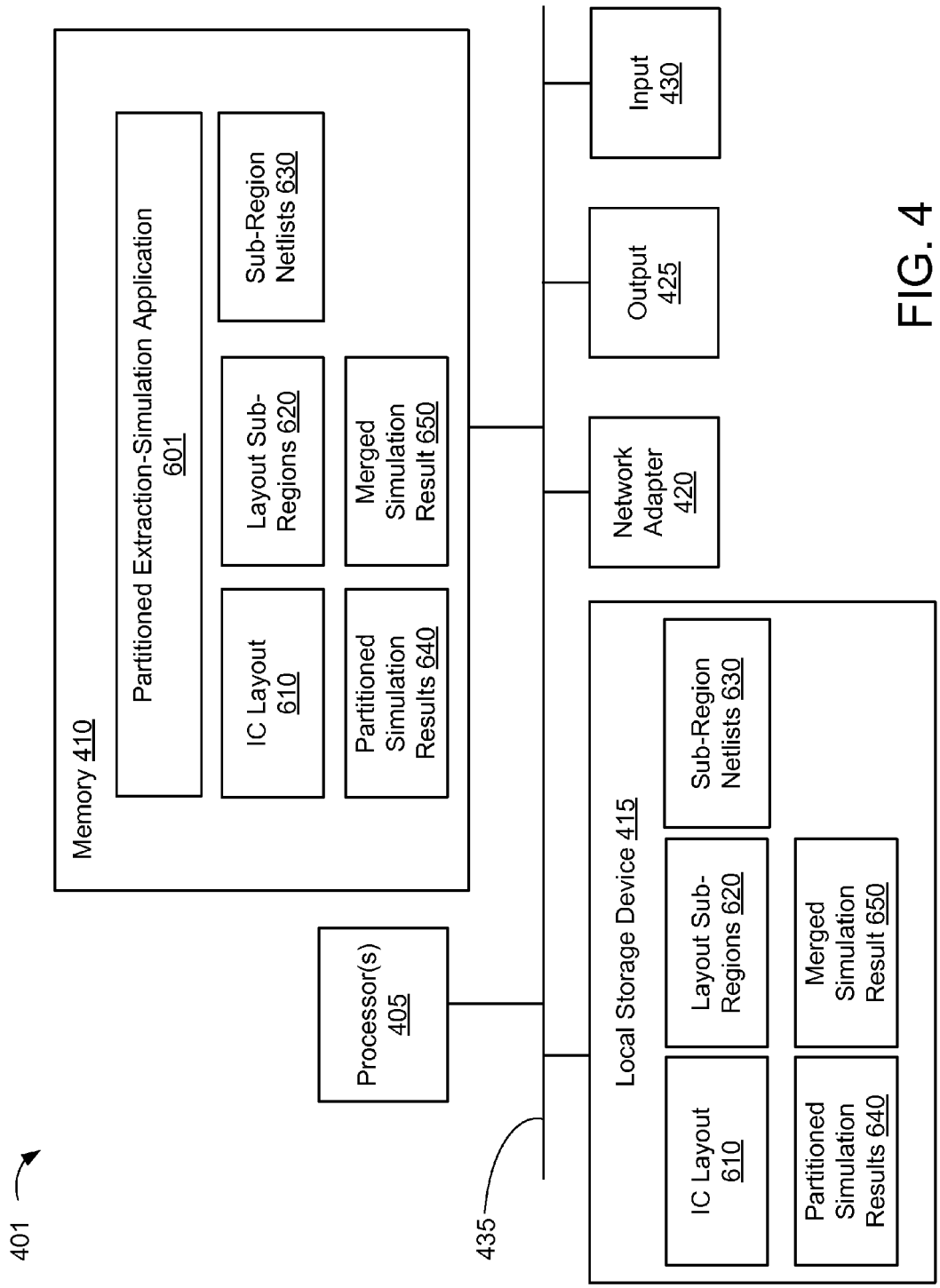
FIG. 4 is a schematic block diagram of an exemplary EDA computer system 401 in accordance with some embodiments.

FIG. 4 is a schematic block diagram of an exemplary EDA computer system 401 in accordance with some embodiments. The exemplary EDA computer system 401 may comprise computer hardware and software components comprising computer processor(s) 405, memory 410, local storage device(s) 415, network adapter(s) 420, output component(s) 425, and input component(s) 430 coupled by a bus 435. The exemplary EDA computer system 401 may be configured for performing various EDA functions, stages, or steps required for IC layouts.

The processors 405 are the central processing units (CPUs) of the computer system 401. Processors 405 may include programmable general-purpose or special-purpose microprocessors, application specific integrated circuits (GPUs, ASICs), digital signal processors (DSPs), etc., or any combination of such processors. The network adapter 420 may comprise circuitry components needed to connect the computer system 401 to a network and to receive and transmit data over the network, such as a wide area network, virtual private network implemented over a public network (Internet), a local area network (LAN), etc. The network adapter 420 comprises a plurality of ports (for coupling the computer system 401 to one or more other computer systems through one or more network connections over the network), and a network port controller (e.g., Ethernet cards), or other physical device that controls the receiving and transmitting of data over the network. For example, the network adapter 420 may provide a plurality of ports for coupling the computer system 401 to a plurality of other computer systems through a plurality of network connections over the network.

The output components 425 may be components typically used by a computer system to provide information to a user (e.g., design engineer, etc.). For example, the output components 425 may include a monitor, an audio speaker, or an alphanumeric display. The input components 430 may be components typically used to allows a user to provide input information (e.g., user selections) into a computer system. For example, the input components 430 may be a keyboard, a mouse, or a speech recognition system.

Memory 410 comprises storage locations that are addressable by the processor for storing software program instruction code such as the EDA applications described herein. The processors may comprise processing elements and circuitry configured to execute the software program code. Memory 410 may comprise a random access memory (RAM), non-volatile RAM (NVRAM), a read-only memory (ROM), etc. Other processing and memory means, including various computer readable media, may be used for storing and executing software program code pertaining to techniques described herein.

Memory 410 is for storing software program instructions and data structures, such as an operating system and a partitioned extraction-simulation application 601. The operating system may comprise, for example, UNIX®, Windows®, Linux®, or any other operating system. The various applications described herein may configure hardware components of the computer system to produce computer engines, such as a partitioned extraction-simulation engine 601 for performing embodiments described herein. The memory 410 may also store various data structures (DSs), such as an IC layout 610, a plurality of layout sub-regions 620, a plurality of sub-region netlists 630, a plurality of partitioned simulation results 640, and a merged simulation result 650 that are used by the partitioned extraction-simulation engine 601 for performing embodiments described herein.

Local storage 415 may comprise a writable storage device (e.g., disk device, solid state memory, optical device, flash memory, Magnetic Random Access Memory (MRAM), or any other similar media device adapted to store data/information. Local storage 415 may store data needed or produced by the partitioned extraction-simulation application 601 when performing the embodiments described herein. For example, such data may include the IC layout 610, plurality of layout sub-regions 620, plurality of sub-region netlists 630, plurality of partitioned simulation results 640, and merged simulation result 650. The computer system 401 loads data stored on the local storage 415 into memory 410 from which they are accessed by processors 405. If sufficient memory exists on the computer, then some or all of data/information 610, 620, 630, 640, and 650 need not exist on the storage device 415, and may exist only in memory 410.

E. Efficient Partitioned Extraction-Simulation Technique

In some embodiments, the partitioned extraction-simulation application 601 is configured to perform a partitioned extraction-simulation technique that efficiently combines/merges the partitioned extraction technique and the partitioned simulation technique. In some embodiments, the partitioned extraction-simulation technique receives the same initial input and produces the same final output as the partitioned extraction technique and the partitioned simulation technique, but combines the techniques by removing and not performing particular steps of the techniques to provide a more efficient netlist extraction and circuit simulation process. In these embodiments, a partitioning is performed once (the IC layout is partitioned) and the partition is used throughout the technique to the merged simulation result.

Figure 5:
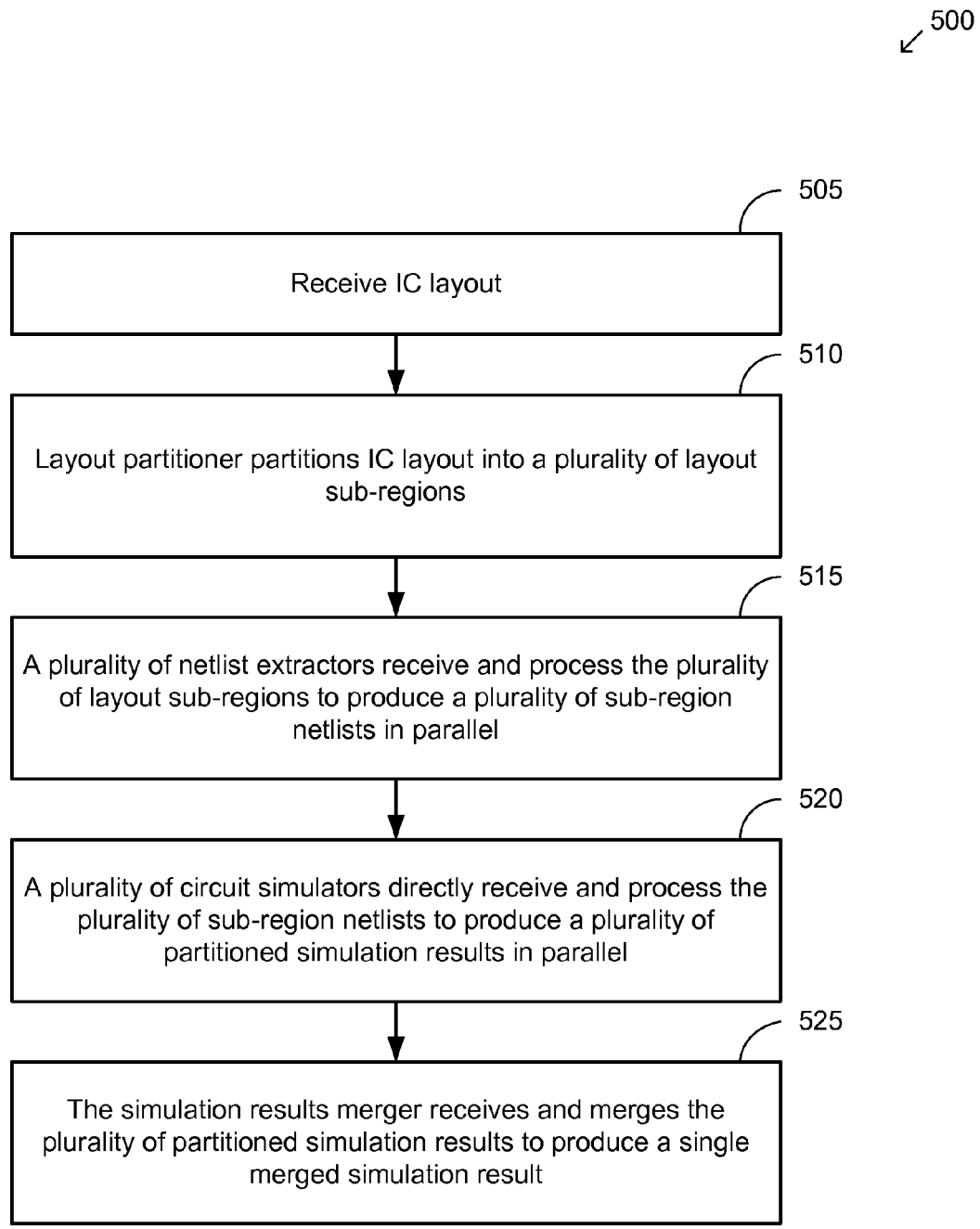
FIG. 5 is a flowchart of a partitioned extraction-simulation technique, in accordance with some embodiments.
Figure 6:
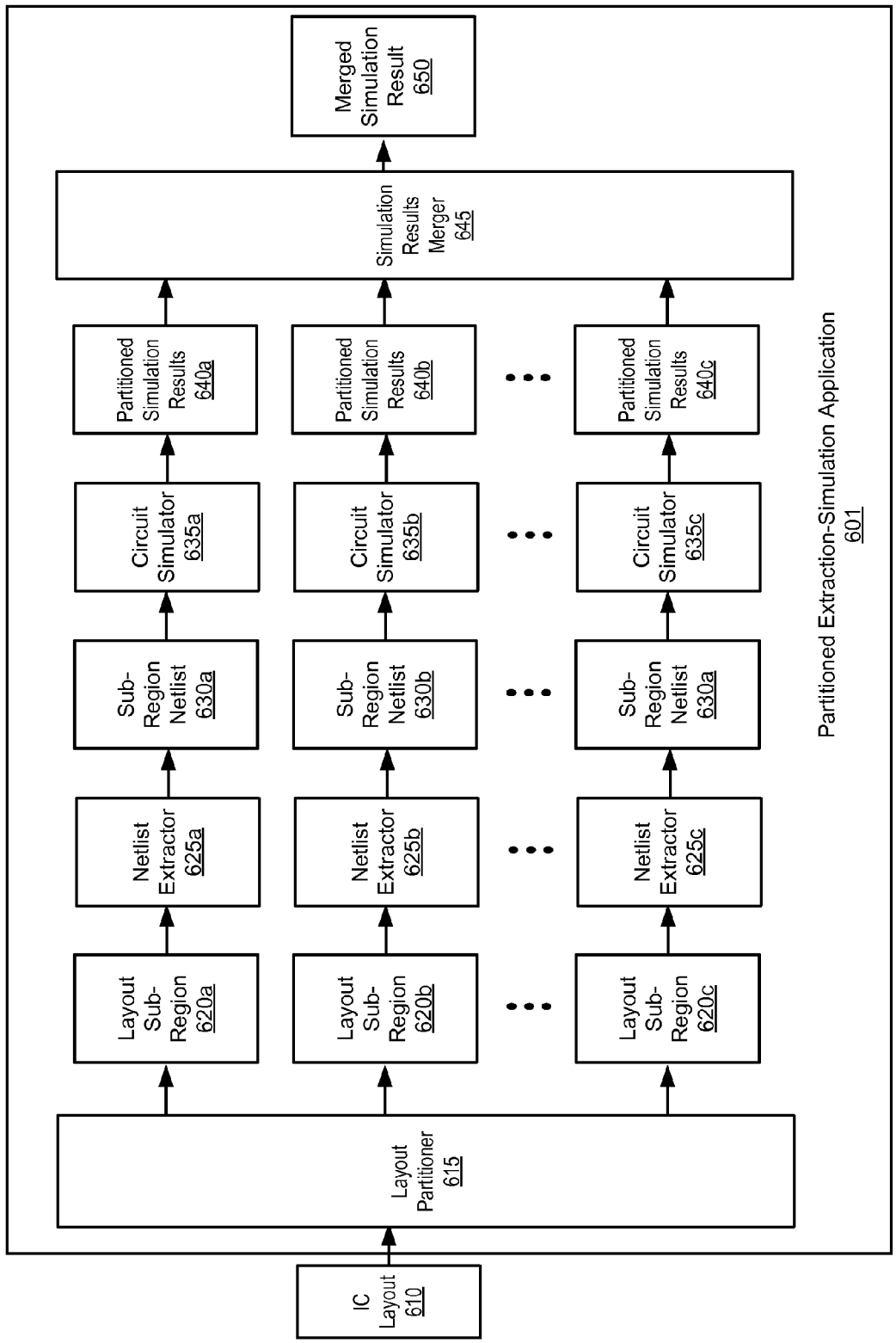
FIG. 6 shows a conceptual diagram of some steps of the partitioned extraction-simulation technique.

FIG. 5 is a flowchart of a partitioned extraction-simulation technique 500, in accordance with some embodiments. In some embodiments, some of the steps of the technique 500 are performed or caused to be performed by a partitioned extraction-simulation application/engine 601 executing on the EDA computer system 401. The order and number of steps of the technique 500 are for illustrative purposes only and, in other embodiments, a different order and/or number of steps are used. FIG. 6 shows a conceptual diagram of some steps of the partitioned extraction-simulation technique.

The technique 500 begins by receiving (at 505) an IC layout 610, as conceptually shown in FIG. 6. A layout partitioner module 615 then partitions/divides (at 510) the layout 610 into a plurality of layout sub-regions 620 (such as 620a, 620b, 620c, etc.), as conceptually shown in FIG. 6. The layout partitioner module 615 may comprise a module of the partitioned extraction-simulation application 601 configured for performing layout partitioning.

A plurality of netlist extractor modules 625 (such as 625a, 625b, 625c, etc.) then receive and process (at 515) the plurality of layout sub-regions 620 to produce a plurality of sub-region netlists 630 (such as 630a, 630b, 630c, etc.), in parallel, as conceptually shown in FIG. 6. Each layout sub-region 620 of the plurality of layout sub-regions 620 is processed by a separate netlist extractor module 625 to produce a separate sub-region netlist 630. In these embodiments, a first layout sub-region 620 is processed by a first netlist extractor 625 during a first time period that overlaps, at least in part, a second time period that a second layout sub-region 620 is processed by a second netlist extractor module 625. A netlist extractor module 625 may comprise a module of the partitioned extraction-simulation application 601.

The number of netlist extractors 625 and circuit simulators 635 may not be 1-1, as indicated in FIG. 6. For example, if different numbers of netlist extractors 625 and circuit simulators 635 may be used depending on their relative speeds, and memory requirements. Also, the number of layout sub-regions h20 and sub-region netlists 630 need not be the same. For example, the netlist extractor outputs from 4 adjacent layout sub-regions can be combined into a single sub-region netlist, and input into a single circuit simulator 635. FIG. 6 shows a 1-1 correspondence of items 620, 625, 630 and 635, but in other embodiments, any variation in their relative numbers may be used.

A plurality of circuit simulator modules 635 (such as 635a, 635b, 635c, etc.) then directly receive and process (at 520) the plurality of sub-region netlists 630 to produce a plurality of partitioned simulation results 640 (such as 640a, 640b, 640c, etc.), in parallel, as conceptually shown in FIG. 6. Each sub-region netlist 630 of the plurality of sub-region netlists 630 is processed by a separate circuit simulator module 635 to produce a separate partitioned simulation result 640. In these embodiments, a first sub-region netlist 630 is processed by a circuit simulator module 635 during a first time period that overlaps, at least in part, a second time period that a second sub-region netlist 630 is processed by a second circuit simulator module 635. A circuit simulator module 635 comprises a module of the partitioned extraction-simulation application 601.

The simulation results merger module 645 then receives and merges/combines (at 525) the plurality of partitioned simulation results 640 to produce a single merged simulation result 650, as conceptually shown in FIG. 6. The simulation results merger module 645 comprises a module of the partitioned extraction-simulation application 601 configured for merging partitioned simulation results. The technique 500 then ends.

In some cases, feedback between the modules may exist in order to improve accuracy or performance. For example, such feedback may induce iterations, whereby circuit simulator modules are called repeatedly until certain accuracy conditions are met.

F. Advantages of Partitioned Extraction-Simulation Technique

As shown in FIGS. 5 and 6, the partitioned extraction-simulation application 601 is configured to perform a partitioned extraction-simulation technique 500 that combines/merges the partitioned extraction technique and the partitioned simulation technique by removing and not performing particular steps of the techniques to provide a more efficient netlist extraction and circuit simulation process.

In some embodiments, the partitioned extraction-simulation technique 500 does not merge the plurality of sub-region netlists to produce a single merged netlist. This merging step is shown FIG. 2, which shows a conventional technique for partitioned netlist extraction, whereby a netlist merger module 235 is used to merge a plurality of sub-region netlists 230 to produce a single merged netlist 240. In some embodiments, the partitioned extraction-simulation technique 500 does not merge the plurality of sub-region netlists to produce a single merged netlist, but rather retains the plurality of sub-region netlists and directly inputs the plurality of sub-region netlists to the plurality of circuit simulator modules without further processing of the plurality of sub-region netlists. This is shown in FIG. 6 whereby the plurality of circuit simulator modules 635 directly receives (from the plurality of netlist extractors) and then processes the plurality of sub-region netlists 630 to produce a plurality of partitioned simulation results 640 in parallel. FIGS. 5 and 6 shows steps of the partitioned extraction-simulation technique 500 and illustrates that the netlist merger module 235 and a merged netlist 240 are not used or produced. By not performing the merging of the plurality of sub-region netlists into a merged netlist, the partitioned extraction-simulation technique 500 provides substantial savings in processing time and resources by removing this step.

In further embodiments, the partitioned extraction-simulation technique 500 also does not partition a merged netlist into a plurality of partitioned netlists. This partitioning step is shown FIG. 3, which shows a conventional technique for partitioned circuit simulation, whereby a netlist partitioner module 315 is used to partition/divide a merged netlist 240 into a plurality of partitioned netlists 320, which are then processed by the plurality of circuit simulators 325. In some embodiments, the partitioned extraction-simulation technique 500 does not partition the merged netlist into a plurality of partitioned netlists, as no merged netlist is produced or used in the technique 500. Rather, the plurality of sub-region netlists 630 are retained (and not merged) and then directly input to the plurality of circuit simulator modules 635, as shown in FIG. 6. FIGS. 5 and 6 shows steps of the partitioned extraction-simulation technique 500 and illustrates that the netlist partitioner module 315 and the plurality of partitioned netlists 320 are not used or produced. By not performing the partitioning of the merged netlist into a plurality of partitioned netlists, the partitioned extraction-simulation technique 500 provides further substantial savings in processing time and resources by removing this step.

In some embodiments, in the partitioned extraction-simulation technique 500, the plurality of circuit simulator modules 635 receives and processes the plurality of sub-region netlists, and not a plurality of partitioned netlists, to produce the plurality of partitioned simulation results. Note that the plurality of sub-region netlists may be different from the plurality of partitioned netlists as they are produced from different sources using different methods. The plurality of sub-region netlists are produced from an IC layout that is physically/spatially partitioned into a plurality of layout sub-regions, which are then processed by netlist extractors to produce the sub-region netlists. In contrast, the plurality of partitioned netlists are produced from a merged netlist that is heuristically partitioned into the plurality of partitioned netlists.

As discussed above, the partitioning of an IC layout may comprise spatial partitioning of the IC layout that is based on the physical dimensions or measurements represented in the IC layout and the physical dimensions or measurements of the IC that is to be eventually manufactured from the layout. This step may sometimes be referred to as physical or spatial partitioning of the layout into a plurality of layout sub-regions. Since a sub-region netlist is extracted from a layout sub-region which has been physically/spatially partitioned from an IC layout, the sub-region netlist is based on a physical or spatial partitioning of the IC layout. A sub-region netlist that has been extracted from a layout sub-region will only contain only those elements that are physically/spatially within and contained in the layout sub-region. As such, in the partitioned extraction-simulation technique 500, the plurality of circuit simulator modules 635 directly receive and process a plurality of sub-region netlists that are based on a physical/spatial partitioning of the IC layout. As such, the plurality of sub-region netlists are based on the physical/spatial partitioning of an IC layout and not based on a graph-based heuristic partitioning of a merged netlist.

In contrast, the plurality of partitioned netlists are produced from a merged netlist that is heuristically partitioned into the plurality of partitioned netlists. To partition the merged netlist into a plurality of partitioned netlists, a netlist partitioner typically applies graph-based heuristic algorithms (such as min-cut algorithm) to heuristically determine how to partition/divide the merged netlist into a plurality of partitioned netlists. As such, the plurality of partitioned netlists are based on graph-based heuristic partitioning of a merged netlist, and not the physical/spatial partitioning of an IC layout.

III. Hybrid Cloud Computing for Electronic Design Automation

Also, to further accelerate processing of IC layouts, hybrid cloud computing providing EDA-based services is proposed. Hybrid cloud computing may comprise EDA processing on one or more client systems as well as one or more server systems (comprising an EDA cloud) connected through a network. In these embodiments, one or more computer systems from a private client network and the public cloud may be used in conjunction to perform EDA processing. Hybrid cloud computing may be desirable when the computational cost of a particular process is significant, and thereby warrants the use of a larger number of computer systems providing greater processor and memory resources. This is particularly relevant for EDA processes which are characterized by long processor runtimes (sometimes over days), and large input and output data sizes. For EDA processes, a public or private cloud can provide additional resources to increase computational speed. A significant problem in the hybrid cloud approach for EDA processes, however, is the relatively slow data transfer rate from a client network to the cloud. In some case, the data transfer from the client network to the cloud may take several hours. In some cases, the data transfer rate within a client network may be 10, 100, or more times faster than the data transfer from the client network to the cloud.

In some embodiments, a hybrid cloud system is implemented using pipelining and serializing ("pipelined serialization") of memory data. In these embodiments, an overall EDA process is divided into a plurality of pipelined stages to accelerate the computational speed of the EDA process. In further embodiments, EDA data is transferred, over a network, from a memory of one computer system directly to a memory of another computer system by serializing the EDA data.

Conventionally, serializing a set of data requires that the entire set of data is first serialized and then the entire set of data is transmitted. If the set of data is large, then there is a significant waiting period for it to transmit to the cloud, before it can be processed. Also note that the size of the EDA data can be very large so that transmittal of the EDA data to the cloud can take a significant amount of time. Conventionally, all of the EDA data is first transmitted from a first computer to a second computer. Conventionally, only after transmission of entire EDA data to the second computer is completed, EDA processing on the second computer begins on the received EDA data.

In some embodiments, transmitting of serialized EDA data begins as soon as any of serialized EDA data is available, without waiting for all of the EDA data to be serialized. For example, if serializing a vector of 1-million resistors, some embodiments serialize data for each resistor and transmit data for the resistor as soon as the serialized data for the resistor is available without waiting for serializing of data for all resistors. This allows the downstream process to receive and process the serialized data for each resistor immediately. As such, instead of waiting for e.g., 1 GB of serialized data to transmit, only e.g., 1 KB of serialized data needs to be serialized and transmitted at a time, and the downstream process can begin as soon as it receives the first 1 KB of serialized data.

In some embodiments, serialized EDA data can be output from one EDA stage of the pipeline as soon as the serialized EDA data is computed. In contrast, conventional techniques use serialization for the output data, but subsequent stages do not start until the data is completely output and received by the subsequent stages. Conventional serialization (e.g. Boost libraries, Objective-c) makes transferring objects from one computer system to another easy by eliminating most details for a specialized implementation per object type, and as such, widely used. However, conventional serialization has to wait until the computation is completed and results (objects) are formed in memory completely, to be able to operate on the objects to serialize the objects. As such, conventional serialization is not compatible with pipelining.

In some embodiments, all outputs of a stage can be pipelined. Conventional systems, such as UNIX® operating system, supports pipelining of the primary output. However, some embodiments herein provides pipelining that allows all outputs of a stage to be pipelined to subsequent stages. For example, Output-A may be pipelined to one set of stages, and Output-B to another set of stages, whereby the sets of stages may or may not be the same set of stages. In some embodiments, multiple outputs are serialized simultaneously, and not just one output transmission. As such, each process may have multiple outputs, which can each go to different downstream processes.

In some embodiments, each EDA application produces a plurality of serialized outputs, each serialized output comprising serialized EDA data received by one or more receiving EDA applications executing on one or more computer systems, wherein the one or more receiving EDA applications begin processing of the serialized EDA data before serializing of all the EDA data is completed. Note that a single computer system may be configured to execute a plurality of EDA applications. A single computer system may typically have processor (e.g., CPU) with multiple cores, or multiple processors which may enable the computer system to execute multiple EDA applications simultaneously.

Moreover, the types of EDA data is wide and varied. EDA applications deal with many types of objects (design, parasitics, constraints, voltages, pindata etc.). As such, it may not be practical to have a special implementation of pipelining for each type of object. In some embodiments, "pipelined serialization" allows the EDA applications to support pipelining of results (objects) of different types to another compute system as the objects are being generated (before computation has completed). In some embodiments, this is accomplished by allowing the pieces of the object to be serialized before the whole object is formed and immediately sending serialized bytes to multiple pipelines. Combining the simplicity of a serialization concept with a pipelining concept allows the Application to use computer resources effectively by performing and processing multiple and different type of Objects' transfers at the same time as the computation. This is especially significant for cloud servers, where the bandwidth to/from cloud and client compute systems may be much smaller than the bandwidth within the cloud.

A. EDA Hybrid Cloud Environment

Figure 7:
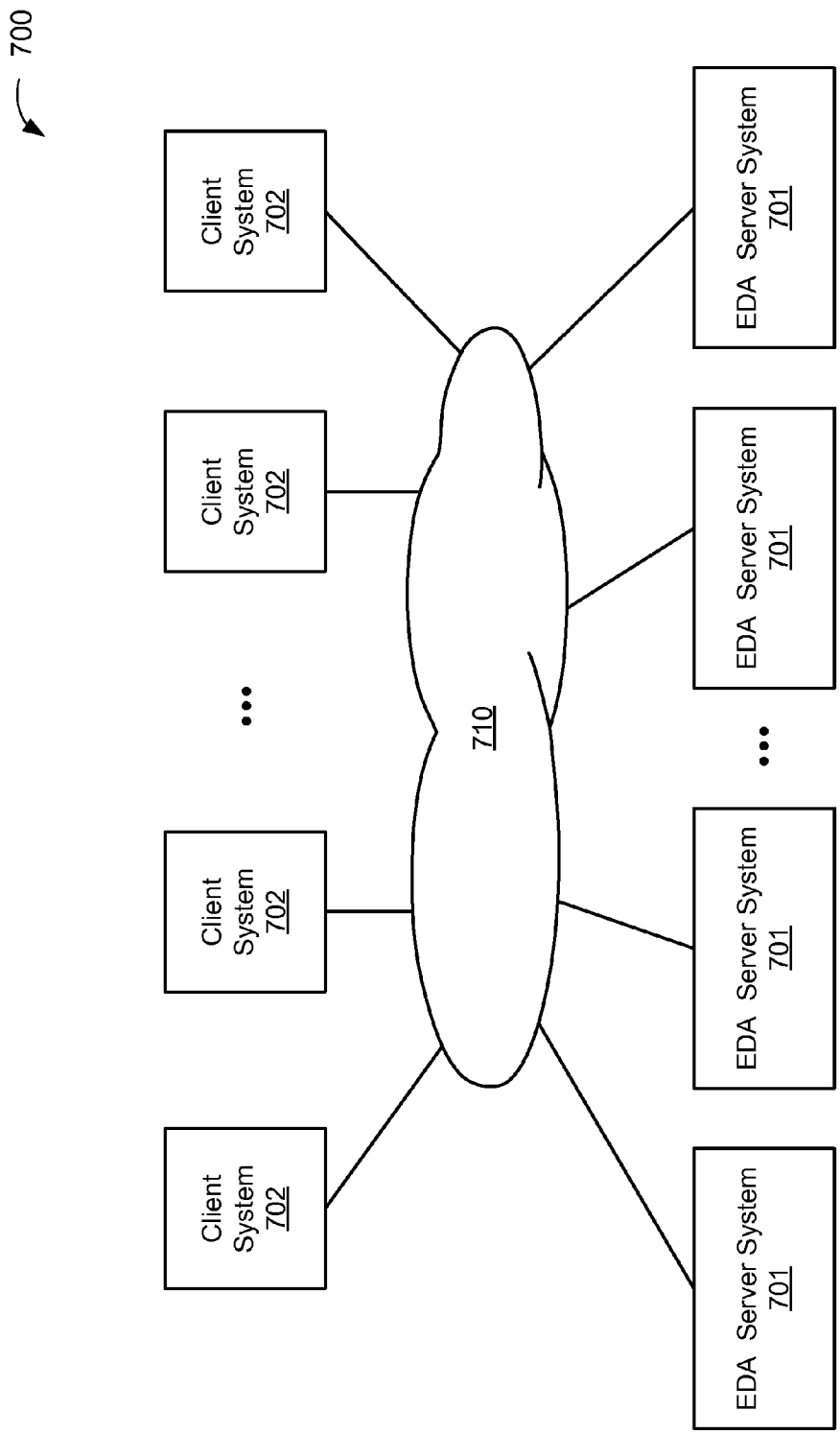
FIG. 7 is a block diagram of an exemplary EDA hybrid cloud environment 700 in which some embodiments operate.

FIG. 7 is a block diagram of an exemplary EDA hybrid cloud environment 700 in which some embodiments operate. The environment 700 comprises one or more EDA client systems 702 that are connected/coupled to one or more EDA server systems 701 through a network 710. The one or more EDA server systems 701 may comprise an EDA cloud that provides EDA-based services to the one or more EDA client systems 702. An EDA server system 701 and an EDA client system 702 may comprise general-purpose computers configured to execute EDA applications over a variety of operating systems. The EDA server system 701 and EDA client system 702 may be referred to generally as an EDA computer system.

The EDA client systems 702 may be connected/coupled to the EDA server systems 701 through the network 710. The network 710 may comprise any type of communication network, such as a wide area network, virtual private network implemented over a public network (Internet), a local area network (LAN), etc. Each EDA client system 702 and EDA server system 701 may comprise a network adapter for connecting the system 702 or 701 to the network 710 and to receive and transmit data over the network 710. Each network adapter may comprise a plurality of ports for allowing simultaneous connecting/coupling to a plurality of one or more other computer systems over the network 710. For example, an EDA client system 702 may be simultaneously connected/coupled to a plurality of EDA server systems 701 through the network 710. Similarly, an EDA server system 701 may be simultaneously connected/coupled to a plurality of EDA client systems 702 through the network 710.

Figure 8:
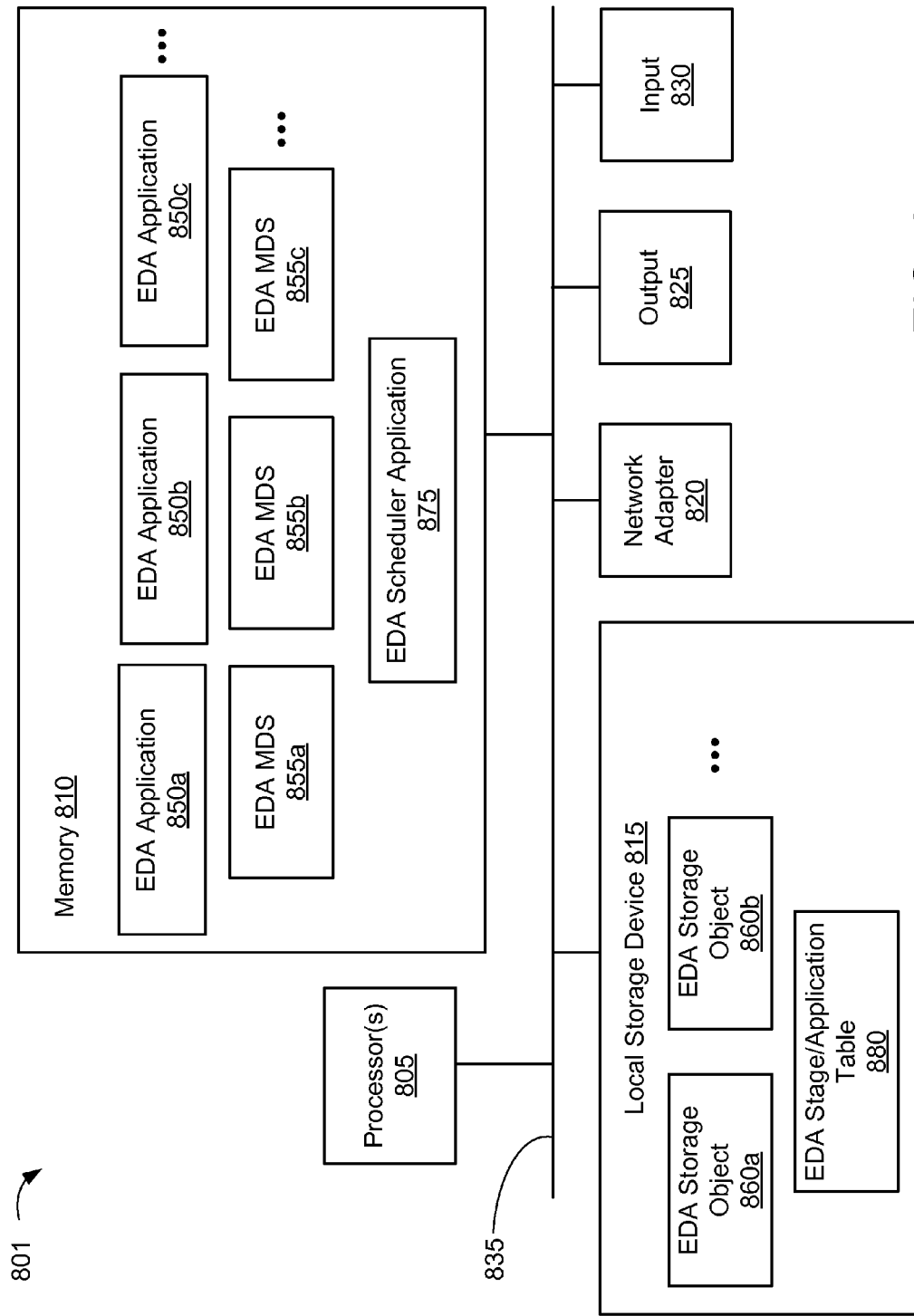
FIG. 8 is a schematic block diagram of an exemplary EDA computer system 801 in accordance with some embodiments.

FIG. 8 is a schematic block diagram of an exemplary EDA computer system 801 in accordance with some embodiments. The EDA computer system 801 may comprise an EDA server system 701 or an EDA client system 702. The exemplary EDA computer system 801 may comprise computer hardware and software components comprising computer processor(s) 805, memory 810, local storage device(s) 815, network adapter(s) 820, output component(s) 825, and input component(s) 830 coupled by a bus 835. Note that the EDA computer system 801 may contain components similar to the components of the EDA computer system 401 illustrated in FIG. 4 (such as the one or more processor(s), memory, local storage, network adapter, output components, and input components coupled by a bus), and these components are not discussed in detail here.

Memory 810 is for storing software program instructions and data structures, such as an operating system, one or more EDA applications 850 (such as 850a, 850b, 850c, etc.), and an EDA scheduler application 875. The operating system may comprise, for example, UNIX®, Windows®, Linux®, or any other operating system. To facilitate access to the local storage device 815, the operating system may implement a file system that organizes data/information as a hierarchical structure of storage objects (such as directories and files) on the local storage device 815. The various applications described herein may configure hardware components of the server system to produce computer engines, such as an EDA engine 850 for performing embodiments described herein.

An EDA application/engine 850 may comprise any module or application used in any of the various stages/steps for producing and/or processing IC layouts. Some examples of EDA applications 850 include an application for designing an IC layout, a layout partitioner, a netlist extractor, a netlist merger, a netlist partitioner, a circuit simulator, a simulation results merger, partitioned extraction application 201, partitioned simulation application 301, partitioned extraction-simulation application 601, etc. The EDA applications/engines 850 may produce or process EDA data in accordance with some embodiments.

EDA data comprises data that is used (as input) or produced (as output) by any EDA application for producing and/or processing IC layouts, such as data used or produced in the designing, analyzing, and/or simulating of IC layouts. Examples of EDA data include data describing/representing an IC layout, a layout sub-region, a sub-region netlist, a merged netlist, a partitioned netlist, a partitioned simulation result, and a merged simulation result. In other embodiments, EDA data may comprise any other data used in the various stages/steps for producing and/or processing IC layouts. EDA data may be stored on a storage device (as an EDA storage object) or in memory (as an EDA memory data structure).

When stored on a storage device (e.g., disk device), EDA data is stored as an EDA storage object having formatting (referred to as EDA-based formatting) from an EDA application. As shown in FIG. 8, the local storage device 815 stores one or more EDA storage objects 860 (such as 860a, 860b, etc.). An EDA storage object may comprise any type of data container that stores EDA data, such as an EDA file or EDA database. In some embodiments, an EDA application 850 may format and store EDA data as an EDA file or EDA database, the format being an EDA-based format. Examples of EDA-based formats include Graphic Database System II (GDSII), Open Artwork System Interchange Standard (OASIS), LEF/DEF, etc. An EDA-based format may comprise any file or database format specifically used by EDA applications. Note that EDA-based formatting is typically different than in-memory representations (such as serialized data formatting). An EDA storage object is also referred to as an EDA representation of the EDA data.

The EDA computer system 801 loads the EDA data stored on the local storage device 815 into memory 810 from which they are accessed by processors 805. When loaded and stored in memory 810, EDA data is stored as an EDA memory data structure. As shown in FIG. 8, the memory 810 stores one or more EDA memory data structures (MDSs) 855 (such as 855a, 855b, 855c, etc.). A memory data structure may comprise various types of memory data structures, such as arrays, maps, lists, trees, etc. When loading an EDA storage object 860 from a storage device 815 to memory 810, the EDA application 850 may parse the formatted EDA storage object 860 to extract the unformatted EDA data, which is then stored as a memory data structure 855 in memory. An EDA memory data structure 855 is also referred to as an in-memory representation of the EDA data.

In some embodiments, the memory 810 may also store an EDA scheduler application 875 configured for coordinating other EDA applications 850, in accordance with embodiments herein. The EDA scheduler application 875 typically resides on the EDA client system 702, but in other embodiments, resides on an EDA server system 701.

B. Pipelining Functions

In some embodiments, the EDA scheduler application 875 may be configured to divide an overall EDA process into a processing pipeline comprising a plurality of different EDA processing stages/steps. Each EDA stage may comprise a sub-portion of the overall processing work for completing the overall EDA process. As known in the art, pipelining is a technique for parallelizing computation on one or more computer systems, whereby the stages of the pipeline are executed in parallel and computation of one or more stages begins before data transfer has completed to the one or more stages. Pipelined architectures may pass a stream of data (sorted, or unsorted) between the stages.

In some embodiments, the pipeline comprises a plurality of processing stages having a predetermined execution sequence order to be performed on a set of EDA data (such as a selected EDA storage object). For example, a first stage will process the EDA data and then pass the processed EDA data to a second stage, which will then process the EDA data and pass the processed EDA data to a third stage, etc. In pipelining, a next stage will typically begin processing data as it is received from a previous stage, and will not wait until all the processed data from the previous stage is received.

In some embodiments, the overall EDA process may be divided such that each EDA stage may be performed by a different EDA module/application. For example, the overall EDA process may comprise netlist extraction and circuit simulation illustrated in FIG. 1. The EDA scheduler application 875 may divide this overall EDA process into 2 separate stages, each performed by a different EDA module/application: 1) netlist extraction of the IC layout performed by a netlist extractor, and 2) circuit simulation performed by the circuit simulator. As such, each stage may correspond to and be associated with a particular EDA module/application. In some embodiments, each EDA stage/application may be associated with a unique identifier. A table 880 comprising a listing of EDA stages/applications and their unique identifiers may be stored, for example, in the local storage device 815 of each EDA computer system 801.

In addition, the EDA scheduler application 875 may be configured for assigning the various stages to a plurality of EDA computer systems 801 (such as EDA server system 701 or EDA client system 702) for executing the assigned stage. For example, the EDA scheduler application 875 may assign initial stages to be executed by the EDA client system 702 and later stages to be executed by one or more EDA server systems 701. Each assigned EDA stage/application may be identified by their unique identifier.

Further, the EDA scheduler application 875 may be configured for performing all coordinating functions between the plurality of assigned EDA computer systems 801 to ensure that the overall EDA process is properly performed by the plurality of assigned EDA computer systems 801. For example, the EDA scheduler application 875 may coordinate which EDA data is sent/transmitted to which EDA computer system 801 and when such EDA data is sent/transmitted. To do so, the EDA scheduler application 875 may monitor the progress of execution of each stage on each assigned EDA computer system 801, and cause to be transmitted EDA data between the stages when appropriate.

In some embodiments, the some or all of the EDA applications 850 implement pipelining functions, and are capable of transmitting or causing to be transmitted EDA data from a previous stage to a next stage in the pipeline before the previous stage has finished processing the EDA data. In these embodiments, the next stage begins processing the EDA data received from the previous stage as the EDA data is received. As such, the next stage begins processing the EDA data from the previous stage before the previous stage has finished processing all the EDA data. In this manner, the various stages of the pipeline may simultaneously process EDA data to provide faster execution of the overall EDA process.

C. Serializing Functions

In some embodiments, the some or all of the EDA applications 850 may be configured to also perform serializing functions on the overall EDA process for reducing the amount of the EDA data transferred over a network. For example, when EDA data is needed to be transmitted, over a network, from a first EDA computer system 801 to a second EDA computer system 801, the EDA application 855 may cause the EDA data to be transmitted from directly from a first memory of the first EDA computer system 801 to a second memory of the second EDA computer system 801. In these embodiments, the EDA data is stored in the first memory as an EDA memory data structures (MDSs) 855. The EDA data is then serialized to form a stream of serialized data that is transmitted over the network directly to the second memory of the second EDA computer system 801.

As known in the art, when an EDA application stores EDA data from memory onto a storage device (e.g., disk), the EDA application formats the EDA data to produce an EDA storage object having EDA-based formatting, which is then stored to the storage device. An EDA-based format may comprise a format specifically used by EDA applications. Typically, EDA storage objects are verbose and have redundant data, and also include extra data for the EDA-based formatting. In contrast, EDA data stored in memory as an EDA memory data structures are optimized for efficient computation and typically comprises a lesser amount of data than its corresponding EDA storage object. As known in the art, data in memory data structures in memory may be serialized to prepare the data for transfer over a network. As known in the art, serialization is the process of translating memory data structures or object state into a suitable format that can be stored (e.g., in a file or buffer, or transmitted across a network) and recreated later when the resulting bit stream is reread according to the serialization format used (thus recreating a clone of the original).

As such, transmitting EDA data over a network from an EDA memory data structure in memory typically comprises transmitting less data than transmitting the same EDA data as an EDA storage object from a storage device. In addition, access of memory devices are also typically much faster than access of storage devices. In addition, the serialized form can be efficiently cloned into an in-memory data structure on the receiving computer, with minimal computational cost. Thus the transmitting of EDA data in serialized form over a network directly between computer system memories devices will reduce the time and/or computation required for the data transfer.

D. EDA Hybrid Cloud Technique

Figure 9A:
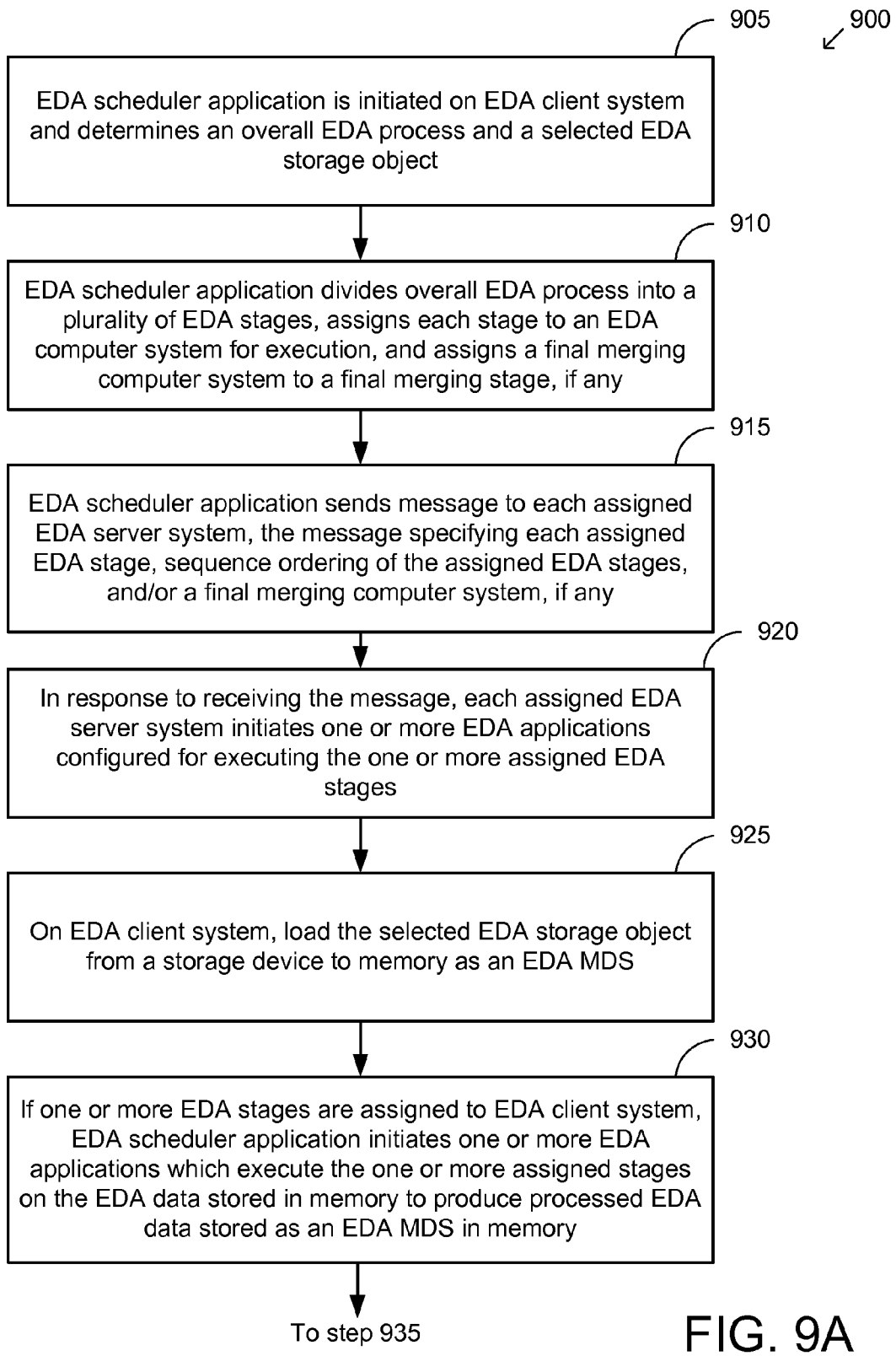
FIGS. 9A-B is a flowchart of an EDA hybrid cloud technique, in accordance with some embodiments.
Figure 9B:
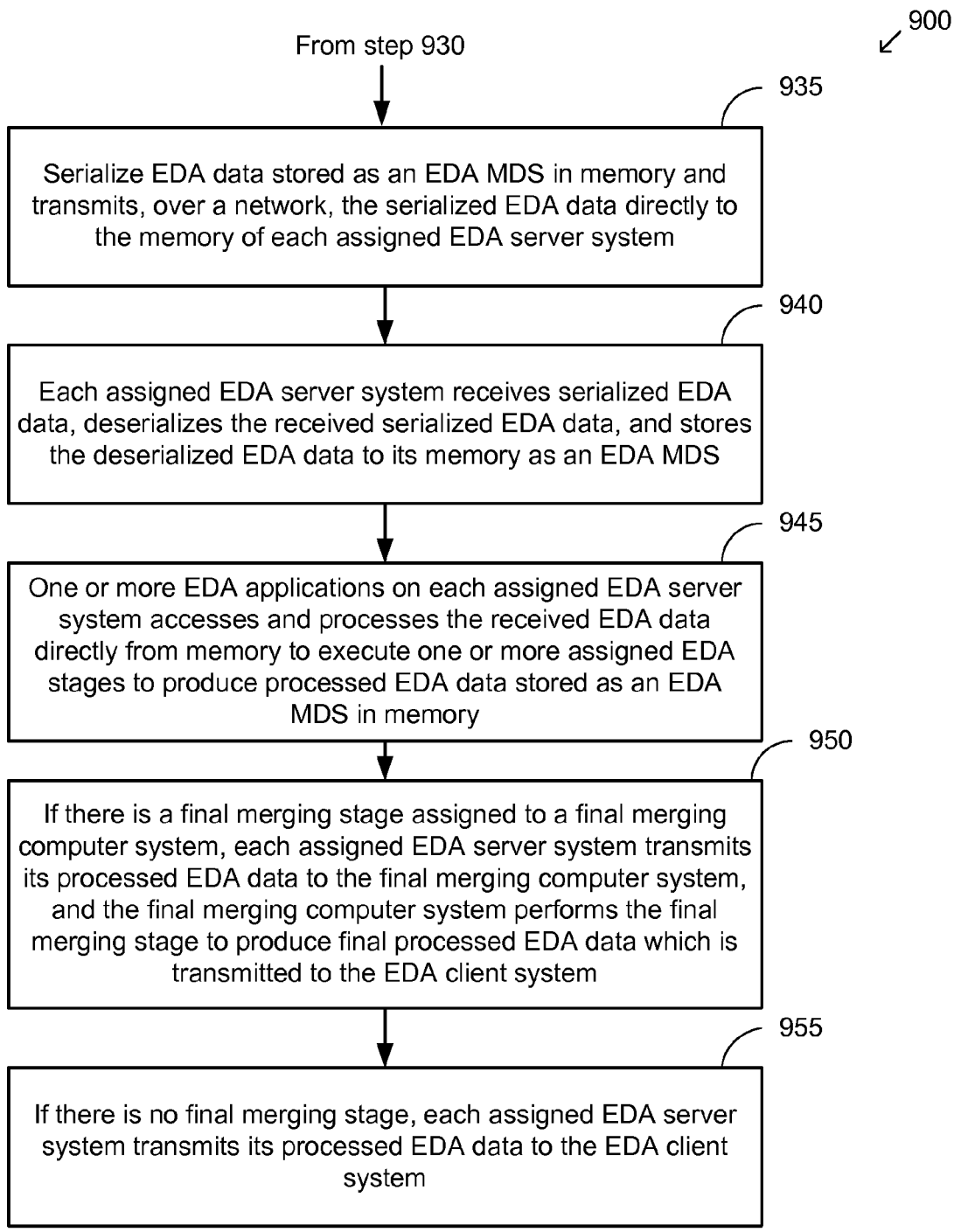

FIGS. 9A-B is a flowchart of an EDA hybrid cloud technique 900, in accordance with some embodiments. In some embodiments, an EDA scheduler application 875, one or more EDA applications 850, and operating systems executing on one or more EDA client systems 702 and one or more EDA server systems 701 operate in conjunction to perform some or all of the steps of the technique 900. In some embodiments, the technique 900 is implemented using pipelining functions and/or serializing functions. In some embodiments, the technique 900 only implements pipelining functions, only implements serializing functions, implements both pipelining functions and serializing functions, or implements neither pipelining functions nor serializing functions. The order and number of steps of the technique 900 are for illustrative purposes only and, in other embodiments, a different order and/or number of steps are used.

The technique 900 begins when the EDA scheduler application 875 is initiated (at 905) on an EDA client system 702 and determines an overall EDA process and a selected EDA storage object (comprising selected EDA data) on which to perform the overall EDA process. For example, the EDA scheduler application 875 may be initiated by a user of the EDA client systems 702 and the overall EDA process and EDA storage object selected by the user. For security reasons, the selected EDA storage object 860 is typically stored on the local storage device 815 of the EDA client system 702. In the embodiments described below, the technique 900 is initiated on the EDA client system which executes the EDA scheduler application 875. In other embodiments, however, the technique 900 is initiated on an EDA server system which executes the EDA scheduler application 875.

The EDA scheduler application 875 then divides (at 910) the overall EDA process into a plurality of EDA stages, each EDA stage to be executed by an associated/corresponding EDA application. Also, the EDA scheduler application 875 assigns (at 910) the plurality of EDA stages to a plurality of EDA computer systems 801 (such as EDA server system 701 or EDA client system 702) for executing the assigned stage. In some embodiments, at least one EDA stage is assigned to at least one EDA server system 701 for executing the assigned EDA stage. Each EDA stage may be assigned to be performed by one or more EDA computer systems 801. For example, the EDA scheduler application 875 may assign one or more stages to be executed by the EDA client system 702 and one or more stages to be executed by one or more EDA server systems 701. Note that the same EDA stage may be assigned to two different EDA computer systems 801 so that the same EDA stage is processed in parallel for different EDA data. Also, the EDA scheduler application 875 determines (at 910) if there is a final "merging" stage in the overall EDA process that requires processed EDA data from two or more different EDA computer systems 801 and, if so, assigns a particular EDA computer system 801 (referred to as the final merging computer system) to execute the final merging stage. Note that the final merging EDA computer system may comprise an EDA client system 702 or an EDA server system 701.

The EDA scheduler application 875 then sends (at 915) a message to each EDA server system 701 and each EDA client system 702, assigned to perform an EDA stage. In some embodiments, the message may specify each EDA stage/application assigned to the EDA server system 701 and each EDA client system 702, an ordering of the assigned EDA stages, and/or the final merging computer system (if any). For example, the ordering may specify the execution sequence order of the assigned EDA stages. For example, the final merging computer system may be specified by a unique identifier, such as the IP address of the final merging computer system. In response to receiving the message, each EDA server system 701 initiates (at 920) one or more EDA applications configured for executing the one or more assigned EDA stages and waits to receive EDA data from the EDA client system 702 through a network connection.

The EDA scheduler application 875 on the EDA client system 702 then instructs an EDA application to load (at 925) the selected EDA storage object 860 (comprising selected EDA data) from its local storage device 815 to its memory 810 as an EDA memory data structure (MDS) 855. To do so, the selected EDA storage object may be parsed to extract the selected EDA data from the EDA-based formatting of the storage object. Once extracted, the selected EDA data is then stored in memory as an EDA memory data structure (MDS) 855.

If one or more EDA stages have been assigned to be executed by the EDA client system 702, the EDA scheduler application 875 then initiates (at 930) one or more EDA applications configured to perform the one or more assigned stages. The one or more EDA applications then execute the one or more assigned stages on the selected EDA data stored in memory (stored as an EDA MDS 855) to produce processed EDA data stored in memory (also stored as an EDA MDS 855).

Any of the one or more EDA applications on the EDA client system 702 may then serialize (at 935) the EDA data stored in memory (stored as an EDA MDS 855) and transmit, over a network, the serialized EDA data directly to the memory of each assigned EDA server system 701. Serialization of the EDA data converts the in-memory EDA MDS into a bit stream in a format suitable for transmission over a network. Serialization of the EDA data allows the EDA data to be transferred over a network directly from memory. The serialized EDA data is then sent directly to the memory of one or more EDA server systems 701. Serialization significantly reduces the data size and computational cost of the EDA data to be transmitted (in comparison to storage object), and allows faster access to the EDA data directly from memory (in comparison to accessing a storage object on a storage device).

Each assigned EDA server system 701 then receives (at 940) the serialized EDA data from the EDA client system 702 through the network, deserializes the received serialized EDA data, and stores the deserialized EDA data directly to its memory 810. The deserialized EDA data comprises EDA data stored as an EDA MDS 855 in memory. Deserializing comprises reading the received serialized bit stream of EDA data according to the serial formatting used, which will then reproduce the original EDA MDS 855 sent from the memory of the EDA client system 702. In essence, the EDA MDS is efficiently cloned from one machine to another.

The one or more EDA applications on each assigned EDA server system 701 accesses and processes (at 945) the received EDA data (stored as an EDA MDS 855) directly from memory to execute the one or more assigned EDA stages, in sequence, to produce processed EDA data stored as an EDA MDS 855 in memory. In some embodiments, the EDA stages and EDA applications are configured to be pipelined and being computation as soon as any EDA data is received. In these embodiments, the EDA applications begin processing the received EDA data when any serialized EDA data is received and deserialized, without waiting for the entire stream of serialized EDA data to be received from the EDA client system 702. As such, the EDA applications begin processing the received EDA data as soon as any EDA data is received, without waiting for all of the serialized EDA data to be received from the EDA client system 702 (i.e., the EDA application on an assigned EDA server system 701 begins processing the EDA data in memory before transmitting of the serialized EDA data to the assigned EDA server system 701 is completed). Note that pipelining can be applied to all stages of computation. That is, both on the EDA client, and the EDA server side.

If there is a final merging stage assigned to a final merging computer system, each assigned EDA server system 701 then transmits (at 950) its processed EDA data to the final merging computer system over the network (unless the EDA server system 701 is itself the final merging computer system). The processed EDA data may be transmitted using the serializing technique by serializing the processed EDA data in memory and transmitting directly to the memory of the final merging computer system. The final merging computer system then performs (at 950) the final merging stage on the received EDA data to produce final processed EDA data and transmits the final processed EDA data to the EDA client system 702 over the network (unless the EDA client system 702 is itself the final merging computer system). The final processed EDA data may also be transmitted using the serializing technique by serializing the final processed EDA data in memory and transmitting directly to the memory of the EDA client system 702. The technique 900 then ends. Pipelining may also applied in the final merging stage to further reduce turn-around-time.

If there is no final merging stage, each assigned EDA server system 701 then transmits (at 955) its processed EDA data to the EDA client system 702 over the network. The processed EDA data may be transmitted using the serializing technique by serializing the processed EDA data in memory and transmitting directly to the memory of the EDA client system 702. The technique 900 then ends.

In other embodiments, final processed EDA data may remain on the EDA server system, and the user of the EDA client system may access and browse the processed EDA data remotely (e.g., using a web-browser, or a dedicated results viewer). As such, the final processed EDA data does not need to be transmitted back to the EDA client system and the cost of sending the final processed EDA back to the client system is minimized.

As described above, a hybrid cloud system may be implemented using pipelining and serializing ("pipelined serialization") of memory data. In these embodiments, an overall EDA process is divided into a plurality of pipelined stages to accelerate the computational speed of the EDA process. In further embodiments, EDA data is transferred, over a network, from a memory of one computer system directly to a memory of another computer system by serializing the EDA data. In some embodiments, transmitting of serialized EDA data begins as soon as any of the serialized EDA data is available, without waiting for all of the EDA data to be serialized. In some embodiments, serialized EDA data can be output from one EDA stage of the pipeline as soon as the serialized EDA data is computed. Some embodiments herein provide pipelining that allows all outputs of a stage to be pipelined to subsequent stages. In some embodiments, multiple outputs are serialized simultaneously, and not just one output transmission. As such, each process may have multiple outputs, which can each go to different downstream processes. In some embodiments, "pipelined serialization" allows the EDA applications to support pipelining of results (objects) of different types to another compute system as the objects are being generated (before computation has completed). In some embodiments, this is accomplished by allowing the pieces of the object to be serialized before the whole object is formed and immediately sending serialized bytes to multiple pipelines.

IV. Partitioned Extraction-Simulation Technique with Cloud Computing

Figure 10A:
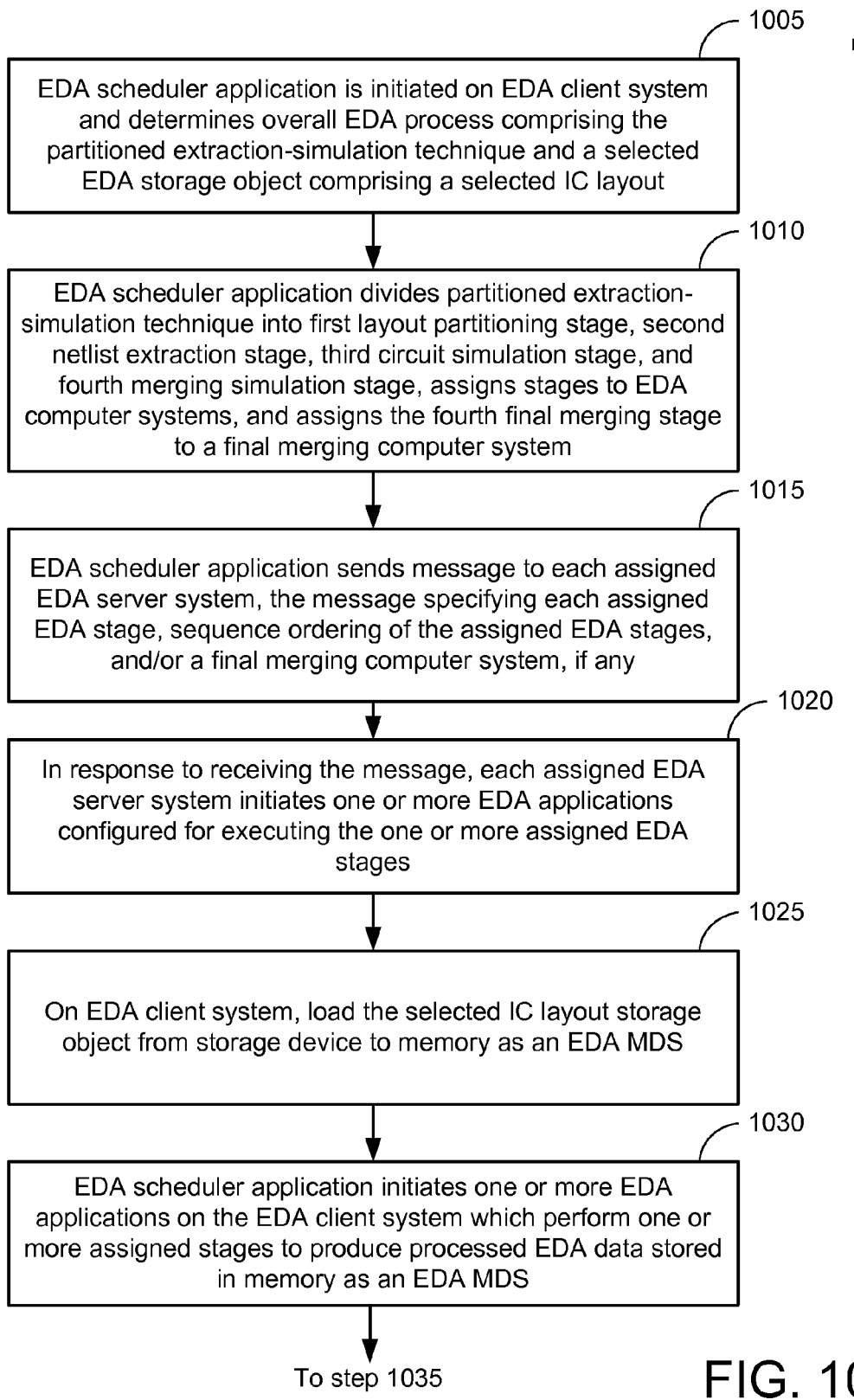
FIGS. 10A-B is a flowchart of a technique that combines the hybrid cloud technique of FIG. 9 with the partitioned extraction-simulation technique of FIG. 5, in accordance with some embodiments.
Figure 10B:
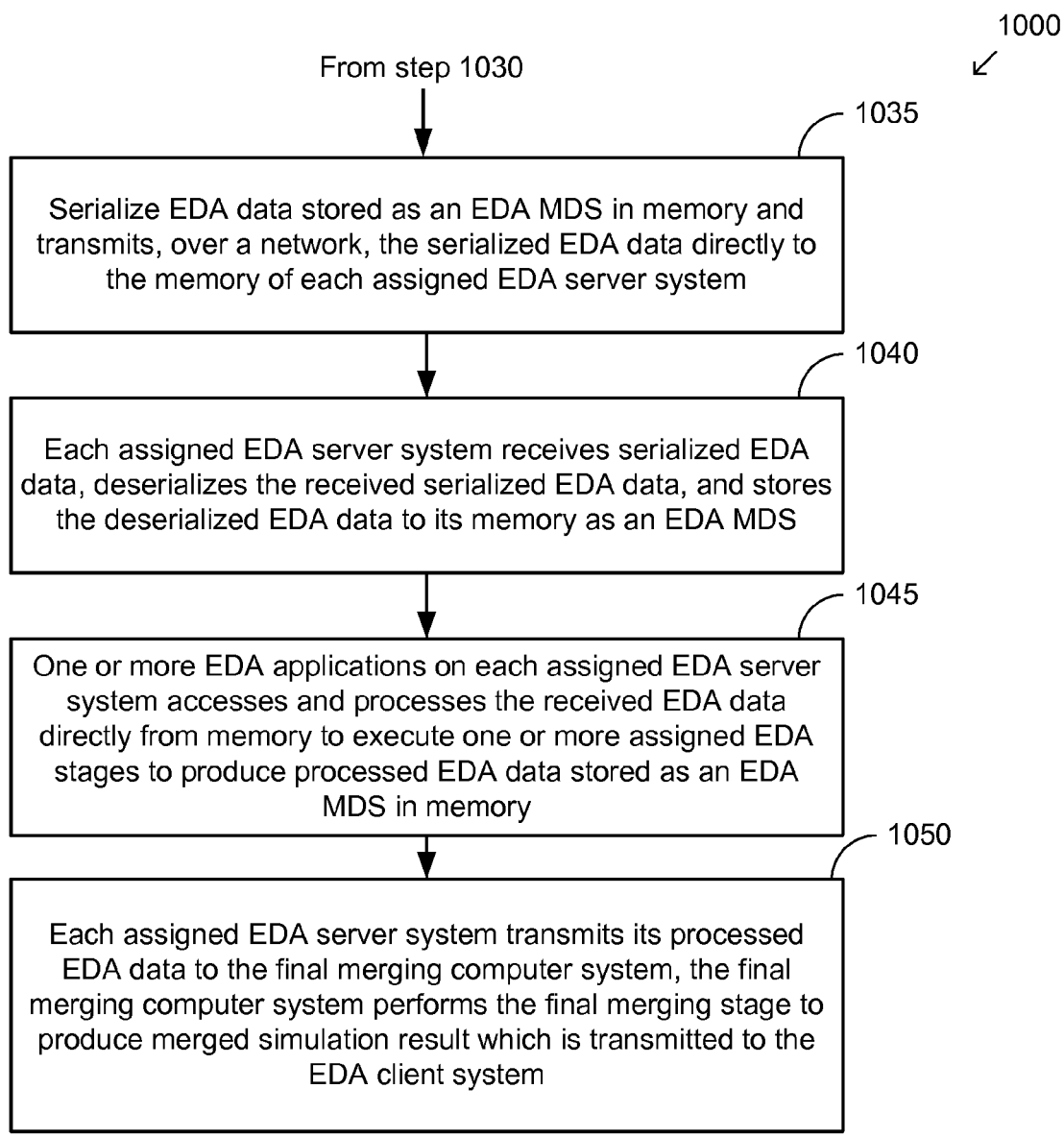

FIGS. 10A-B is a flowchart of a technique 1000 that combines the hybrid cloud technique 900 of FIG. 9 with the partitioned extraction-simulation technique 500 of FIG. 5, in accordance with some embodiments. Some steps of the technique 1000 of FIG. 10 are similar to steps of the hybrid cloud technique 900 of FIG. 9, and are not discussed in detail here. In some embodiments, an EDA scheduler application 875, one or more EDA applications 850, and operating systems executing on one or more EDA client systems 702 and one or more EDA server systems 701 operate in conjunction to perform some or all of the steps of the technique 1000. In some embodiments, the technique 1000 is implemented using pipelining functions and/or serializing functions. In some embodiments, the technique 1000 only implements pipelining functions, only implements serializing functions, implements both pipelining functions and serializing functions, or implements neither pipelining functions nor serializing functions. The order and number of steps of the technique 1000 are for illustrative purposes only and, in other embodiments, a different order and/or number of steps are used.

The technique 1000 begins when the EDA scheduler application 875 is initiated (at 1005) on an EDA client system 702 and determines an overall EDA process (comprising the partitioned extraction-simulation technique) and a selected EDA storage object (comprising a selected IC layout) on which to perform the partitioned extraction-simulation technique. The selected IC layout storage object may be stored on the local storage device 815 of the EDA client system 702.

The EDA scheduler application 875 then divides (at 1010) the partitioned extraction-simulation technique into a plurality of EDA stages, each EDA stage to be executed by an associated EDA application. In some embodiments, the partitioned extraction-simulation technique is divided into EDA stages/applications as illustrated in FIG. 6. For example, the partitioned extraction-simulation technique may be divided into a first stage comprising layout partitioning performed by a layout partitioner module 615, a second stage comprising netlist extraction performed by a netlist extractor 625, a third stage comprising circuit simulation performed by a circuit simulator 635, and a fourth stage comprising merging simulation results performed by a simulation results merger module 645. Each EDA stage/application has an associated unique identifier as specified in the EDA stages/applications table 880.

Also, the EDA scheduler application 875 assigns (at 1010) the plurality of EDA stages to a plurality of EDA computer systems 801, determines that the fourth stage as a final "merging" stage (merging simulation results), and assigns the fourth stage to a final merging computer system. For example, the first stage may be assigned to the EDA client system 702 and the remaining second, third, and fourth stages assigned to a plurality of EDA server systems 701. For example, the first and fourth stage may be assigned to the EDA client system 702 and the second and third stages assigned to a plurality of EDA server systems 701. For example, the first and second stages may be assigned to the EDA client system 702 and the third and fourth stages assigned to a plurality of EDA server systems 701. For example, the first, second, and fourth stages may be assigned to the EDA client system 702 and the third stage assigned to a plurality of EDA server systems 701. In other embodiments, the stages are assigned in a different manner.

Note that the same EDA stage may be assigned to two different EDA computer systems 801 so that the same EDA stage is processed in parallel. For example, the second stage may be assigned to a plurality of EDA server systems 701 so that a plurality of netlist extractors 625 process a plurality of layout sub-regions 620 to produce a plurality of sub-region netlists 630 in parallel, as conceptually shown in FIG. 6. For example, the third stage may be assigned to a plurality of EDA server systems 701 so that a plurality of circuit simulator modules 635 process a plurality of sub-region netlists 630 to produce a plurality of partitioned simulation results 640 in parallel, as conceptually shown in FIG. 6.

The EDA scheduler application 875 then sends (at 1015) a message to each EDA server system 701 assigned to perform an EDA stage. The message may specify each EDA stage/application assigned to the EDA server system 701, an ordering of the assigned EDA stages, and/or the final merging computer system. In response to receiving the message, each EDA server system 701 initiates (at 1020) one or more EDA applications configured for executing the one or more assigned EDA stages.

The EDA scheduler instructs an application on the EDA client system 702 to load (at 1025) the selected IC layout storage object (comprising selected EDA data) from its local storage device 815 to its memory 810 as an EDA MDS 855. The EDA scheduler application 875 then initiates (at 1030) one or more EDA applications on the EDA client system 702 configured to perform one or more assigned stages. The one or more EDA applications then execute (at 1030) the one or more assigned stages on the selected EDA data in memory to produce processed EDA data stored in memory (also stored as an EDA MDS 855).

For example, at step 1030, the EDA client system 702 may perform the first stage (layout partitioning performed by a layout partitioner module 615) which processes the IC layout 610 to produce a plurality of layout sub-regions 620 which are stored in memory as a plurality of EDA MDSs 855. For example, at step 1030, the EDA client system 702 may perform the first stage and the second stage (netlist extraction performed by a netlist extractor 625) which processes the plurality of layout sub-regions 620 to produce a plurality of sub-region netlists 630 which are stored in memory as a plurality of EDA MDSs 855.

Any of the one or more EDA applications on the EDA client system 702 may then serialize (at 1035) the EDA data stored in memory (stored as an EDA MDS 855) and transmit, over a network, the serialized EDA data directly to the memory of each assigned EDA server system 701 or EDA client system. Note that serialization may be used even within the client network, or within the server network. That is, it may be used between any two EDA applications that interact with each other on a same computer system. For example, the EDA application(s) may serialize and transmit the plurality of layout sub-regions 620 and/or the plurality of sub-region netlists 630 to the memories of the plurality of assigned EDA server systems 701.

Each assigned EDA server system 701 then receives (at 1040) the serialized EDA data from the EDA client system 702 through the network, deserializes the received serialized EDA data, and stores the deserialized EDA data directly to its memory 810 as EDA MDSs 855. For example, each assigned EDA server system 701 may receive, deserialize, and store to memory one or more layout sub-regions 620 and/or one or more sub-region netlists 630.

The one or more EDA applications on each assigned EDA server system 701 accesses and processes (at 1045) the received EDA data (stored as an EDA MDS 855) directly from memory to execute the one or more assigned EDA stages, in sequence, to produce processed EDA data stored as an EDA MDS 855 in memory. In some embodiments, the EDA stages and EDA applications are configured to be pipelined and being computation as soon as any EDA data is received. Note that pipelining may occur on any of the computer system—both client and server systems.

For example, at step 1045, each assigned EDA server system 701 may perform the second stage (netlist extraction performed by a netlist extractor 625) which processes one or more layout sub-regions 620 to produce one or more sub-region netlists 630, which are stored in memory as one or more EDA MDSs 855. For example, at step 1045, the EDA client system 702 may perform the second stage and the third stage (circuit simulation performed by a circuit simulator 635) which processes one or more sub-region netlists 630 to produce one or more partitioned simulation results 640, which are stored in memory as one or more EDA MDSs 855.

Since there is a final merging stage (the fourth stage) assigned to a final merging computer system, each assigned EDA server system 701 then transmits (at 1050) its processed EDA data to the final merging computer system over the network (unless the EDA server system 701 is itself the final merging computer system). The processed EDA data may be transmitted using the serializing technique by serializing the processed EDA data in memory and transmitting directly to the memory of the final merging computer system. The final merging computer system then performs (at 1050) the final merging stage on the received EDA data to produce final processed EDA data and transmits the final processed EDA data to the EDA client system 702 over the network (unless the EDA client system 702 is itself the final merging computer system). The final processed EDA data may also be transmitted using the serializing technique by serializing the final processed EDA data in memory and transmitting directly to the memory of the EDA client system 702. The technique 1000 then ends.

For example, at step 1050, each assigned EDA server system 701 may transmit one or more partitioned simulation results 640 to the final merging computer system over the network. The final merging computer system may then perform the fourth stage (merging simulation results performed by a simulation results merger module 645) which processes the plurality of partitioned simulation results 640 to produce a merged simulation result 650, which is stored in memory as an EDA MDS 855 and transmitted to the EDA client system 702 over the network. The technique 1000 then ends.

In other embodiments, final processed EDA data may remain on the EDA server system, and the user of the EDA client system may access and browse the processed EDA data remotely (e.g., using a web-browser, or a dedicated results viewer). As such, the final processed EDA data does not need to be transmitted back to the EDA client system and the cost of sending the final processed EDA back to the client system is minimized.

In further embodiments, the partitioned extraction-simulation technique may be divided (at 1010) into other EDA stages and assigned to different EDA computer systems 801 other than in the manner described above in relation to FIG. 10. For example, any of the four stages may be divided into multiple sub-stages, each sub-stage assigned to one or more EDA client systems 702 and/or one or more EDA server systems 701. For example, the second stage (comprising netlist extraction) may be divided into several sub-stages, such as layout parsing, layout partitioning, layout cleaning, parasitic extraction, netlist generation, etc. that may be assigned to one or more EDA client systems 702 and/or one or more EDA server systems 701.

In further embodiments, parasitic extraction comprises a sub-stage of the netlist extraction stage (second stage), whereby parasitic elements (resistors and capacitors) are extracted separately for each layout sub-region 620. In these embodiments, the parasitic netlist may be represented as one or more vectors stored in memory 810 as an EDA MDS 855. For example, a first vector may represent every parasitic resistor in the layout sub-region 620, and a second vector may represent every parasitic capacitor in the layout sub-region 620. The vectors may be designed to be compact in data size, as binary representations of data are inherently smaller than conventional ASCII representations typically used as industry standard interchange formats. The vectors may then be serialized into a bit stream that can then be further compressed (using standard compression techniques), and then transmitted over the network. The serialized form (bit stream) of the vectors can be transmitted over the network while the parasitic netlist extractor is still executing. As each resistor or capacitor is added to its corresponding vector, the contents of the vectors can be continually serialized and transmitted over the network. This streaming (pipelined) aspect allows subsequent EDA stages of computation (e.g., circuit simulation) to begin before the netlist extraction stage finishes.

VARIOUS EMBODIMENTS

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional element circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, applications, modules, algorithms, techniques, processes, or method steps of embodiments described herein may be implemented as computer electronic hardware, computer software, or combinations of both. To illustrate this interchangeability of hardware and software, various illustrative elements, blocks, applications, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, applications, modules, and circuits described in connection with the embodiments disclosed herein may be implemented or performed with a general-purpose processor, a digital signal processor (DSP), a graphics processing unit (GPU), an application-specific integrated circuit (ASIC), a field programmable gate array (FPGA) or other programmable logic device, discrete gate or transistor logic, discrete hardware elements, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The modules, algorithm, techniques, processes, or methods described in connection with embodiments disclosed herein may be embodied directly in computer hardware configured to perform the embodiments disclosed herein, in software executed by a processor, or in a combination of the two. In some embodiments, any software application, program, application, module, or layer described herein may comprise an engine comprising hardware, software, or a combination of the two configured to perform embodiments described herein. In general, functions of a software application, program, application, module, or layer described herein may be embodied directly in hardware, or embodied as software executed by a processor, or embodied as a combination of the two.

A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete elements in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

We claim:

1. A system, comprising:
a computer system configured to:
access a layout of an integrated circuit, wherein the layout is a data file that includes information describing the integrated circuit represented by the layout, wherein the information includes physical dimensions of circuit elements of the integrated circuit;
partition, based on the physical dimensions in the layout, the layout into a plurality of layout sub-regions;
for each layout sub-region, create a respective netlist representative of that layout sub-region, wherein the computer system is configured to create the netlists via a plurality of netlist extractors, each executable to produce a netlist from one of the plurality of layout sub-regions; and
for each netlist, perform a respective circuit simulation to produce a simulation result for a layout sub-region of that netlist, wherein the computer system is configured to perform the circuit simulations via a plurality of circuit simulators, each executable to produce a simulation result for a layout sub-region.

2. The system of claim 1, wherein the computer system is configured to:
merge the simulation results into a simulation result for the integrated circuit.

3. The system of claim 1, wherein the computer system is configured to:
create the netlists in parallel such that a first layout sub-region is processed by a first of the plurality of netlist extractors during a first time period that overlaps, at least in part, a second time period that a second layout sub-region is processed by a second of the plurality of netlist extractors.

4. The system of claim 1, wherein the computer system is configured to:
perform the circuit simulations in parallel such that a first sub-region netlist is processed by a first of the plurality of circuit simulators during a first time period that overlaps, at least in part, a second time period that a second sub-region netlist is processed by a second of the plurality of circuit simulators.

5. The system of claim 1, wherein the data file has a Graphic Database System II (GDSII) format.

6. A non-transitory computer readable medium having instructions stored thereon that are executable by a computer system to cause the computer system to perform operations comprising:
dividing a layout of an integrated circuit into a plurality of sub-regions including a first sub-region and a second sub-region, wherein the layout includes spatial information that defines dimensions for elements represented in the layout, and wherein the dividing is based on the spatial information;
performing netlist extraction on the first sub-region using a first netlist extractor to produce a first netlist, and on the second sub-region using a second netlist extractor to produce a second netlist;
using the first netlist and a first of a plurality of circuit simulators to perform a first circuit simulation for the first sub-region; and
using the second netlist and a second of a plurality of circuit simulators to perform a second circuit simulation for the second sub-region.

7. The non-transitory computer readable medium of claim 6, wherein the operations further comprise:
merging results of the first and second circuit simulations to produce a merged simulation result for the integrated circuit.

8. The non-transitory computer readable medium of claim 6, wherein the netlist extraction of the first and second sub-regions is performed in parallel.

9. The non-transitory computer readable medium of claim 6, wherein the operations further comprise:
performing the first and second circuit simulations in parallel.

10. A non-transitory computer readable medium having instructions stored thereon that are executable by a computer system to cause the computer system to perform operations comprising:
dividing a layout of an integrated circuit into a plurality of sub-regions including a first sub-region and a second sub-region, wherein the layout includes spatial information that defines dimensions for elements represented in the layout, and wherein the dividing is based on the spatial information;
performing, in parallel, netlist extractions on the first and second sub-regions to produce a first netlist for the first sub-region and a second netlist for the second sub-region;
using the first netlist to perform a first circuit simulation for the first sub-region; and
using the second netlist to perform a second circuit simulation for the second sub-region.

11. A non-transitory computer readable medium having instructions stored thereon that are executable by a computer system to cause the computer system to perform operations comprising:
dividing a layout of an integrated circuit into a plurality of sub-regions including a first sub-region and a second sub-region, wherein the layout includes spatial information that defines dimensions for elements represented in the layout, and wherein the dividing is based on the spatial information;
performing netlist extraction on the first sub-region to produce a first netlist and the second sub-region to produce a second netlist; and
performing, in parallel, a first circuit simulation for the first sub-region and a second circuit simulation for the second sub-region, wherein the first circuit simulation uses the first netlist, and wherein the second circuit simulation uses the second netlist.

* * * * *